(12) United States Patent
Tu et al.

(10) Patent No.: US 11,853,709 B2
(45) Date of Patent: Dec. 26, 2023

(54) TEXT TRANSLATION METHOD AND APPARATUS, STORAGE MEDIUM, AND COMPUTER DEVICE

(71) Applicant: Tencent Technology (Shenzhen) Company Limited, Shenzhen (CN)

(72) Inventors: Zhaopeng Tu, Shenzhen (CN); Longyue Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 716 days.

(21) Appl. No.: 17/063,586

(22) Filed: Oct. 5, 2020

(65) Prior Publication Data

US 2021/0019479 A1 Jan. 21, 2021

Related U.S. Application Data

(63) Continuation of application No. PCT/CN2019/093337, filed on Jun. 27, 2019.

(30) Foreign Application Priority Data

Sep. 5, 2018 (CN) .......................... 201811033545.7

(51) Int. Cl.
*G06F 40/58* (2020.01)
*G06N 3/08* (2023.01)
(Continued)

(52) U.S. Cl.
CPC .............. *G06F 40/58* (2020.01); *G06F 40/30* (2020.01); *G06F 40/47* (2020.01)

(58) Field of Classification Search
CPC .......... G06F 40/58; G06F 40/44; G06F 40/45; G06F 40/47; G06N 3/08
See application file for complete search history.

(56) References Cited

U.S. PATENT DOCUMENTS 5,077,668 A * 12/1991 Doi ........................ G06F 16/345
707/E17.094
5,218,537 A * 6/1993 Hemphill .................. G09B 7/04
704/1
(Continued)

FOREIGN PATENT DOCUMENTS

CN 101458682 A 6/2009
CN 106372053 A 2/2017
(Continued)

OTHER PUBLICATIONS

Wang et al., title={Translating Pro-Drop Languages with Reconstruction Models}, researchgate.net/publication/321361353, Jan. 2018, pp. 1-11 (Year: 2018).*
(Continued)

*Primary Examiner* — Lamont M Spooner
(74) *Attorney, Agent, or Firm* — Morgan, Lewis & Bockius LLP

(57) ABSTRACT

This application relates to a machine translation method performed at a computer device. The method includes: obtaining an original source text and a reconstructed source text; performing semantic encoding on the original source text, to obtain a source vector sequence; sequentially decoding the source vector sequence to obtain target vectors by performing decoding on the source vector sequence at a current time according to a word vector of a candidate target word determined at a previous time, determining a candidate target word at the current time according to a target vector at the current time, and forming a target vector sequence accordingly; performing reconstruction assessment on the source vector sequence and the target vector sequence using the reconstructed source text, to obtain reconstruction scores corresponding to the candidate target words; and generating
(Continued)

a target text according to the reconstruction scores and the candidate target words.

20 Claims, 9 Drawing Sheets

(51) Int. Cl.
*G06F 40/30* (2020.01)
*G06F 40/47* (2020.01)

(56) References Cited

U.S. PATENT DOCUMENTS

| | | | | |
|---|---|---|---|---|
| 5,966,686 | A * | 10/1999 | Heidorn | G06F 40/253 |
| | | | | 704/9 |
| 6,125,342 | A * | 9/2000 | Selesky | G06F 40/253 |
| | | | | 704/9 |
| 7,165,023 | B2 * | 1/2007 | Corman | G06F 40/211 |
| | | | | 704/9 |
| 10,528,866 | B1 * | 1/2020 | Dai | G06N 3/044 |
| 2002/0069046 | A1 * | 6/2002 | Bress | G06F 40/47 |
| | | | | 704/1 |
| 2002/0116170 | A1 * | 8/2002 | Corman | G06F 40/211 |
| | | | | 704/10 |
| 2008/0154577 | A1 * | 6/2008 | Kim | G06F 40/45 |
| | | | | 704/5 |
| 2008/0275691 | A1 * | 11/2008 | Summerlin | G06F 40/40 |
| | | | | 707/E17.073 |
| 2010/0179803 | A1 * | 7/2010 | Sawaf | G06F 40/40 |
| | | | | 704/E15.003 |
| 2012/0316862 | A1 * | 12/2012 | Sultan | G06F 40/53 |
| | | | | 704/4 |
| 2013/0185049 | A1 * | 7/2013 | Zhao | G06F 40/45 |
| | | | | 704/9 |
| 2019/0171655 | A1 * | 6/2019 | Psota | G06Q 10/083 |
| 2020/0184158 | A1 * | 6/2020 | Kuczmarski | G06N 20/00 |
| 2020/0265196 | A1 * | 8/2020 | Ravi | G06N 20/00 |
| 2020/0320984 | A1 * | 10/2020 | Kuczmarski | G06N 20/00 |

FOREIGN PATENT DOCUMENTS

| | | |
|---|---|---|
| CN | 106815215 A | 6/2017 |
| CN | 110020440 A | 1/2018 |
| CN | 107729329 A | 2/2018 |
| CN | 108304390 A | 7/2018 |
| CN | 109145315 A | 1/2019 |

OTHER PUBLICATIONS

Wang et al., title={A novel and robust approach for pro-drop language translation}, 2017, journal={Machine Translation}, vol. {31}, No. {1-2}, pp. {65-87}, publisher={Springer} (Year: 2017).*
Yanlin Hu et al., "Improving Conversational Spoken Language", Chinese National Conference on Social Media Processing, Nov. 12, 2015, 6 pgs., Retrieved from the Internet: https://link.springer.com/chapter/10.1007/978-981-10-0080-5_20.
Tencent Technology, WO, PCT/CN2019/093337, Sep. 29, 2019, 5 pgs.
Tencent Technology, IPRP, PCT/CN2019/093337, Mar. 9, 2021, 6 pgs.
Tencent Technology, ISR, PCT/CN2019/093337, Sep. 29, 2019, 2 pgs.

* cited by examiner

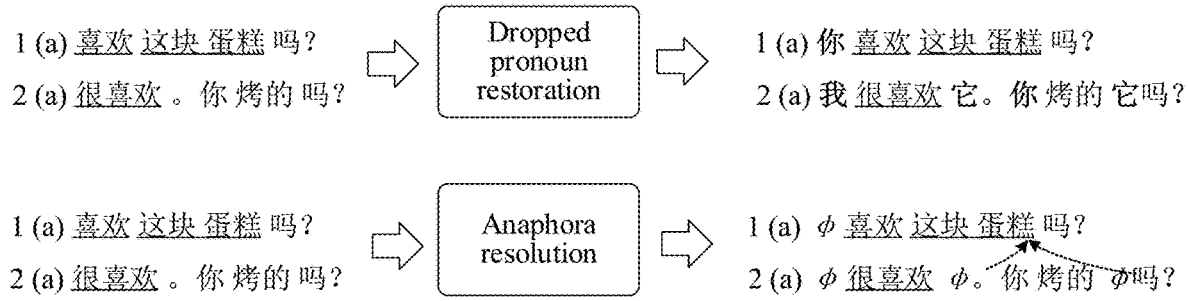
FIG. 3
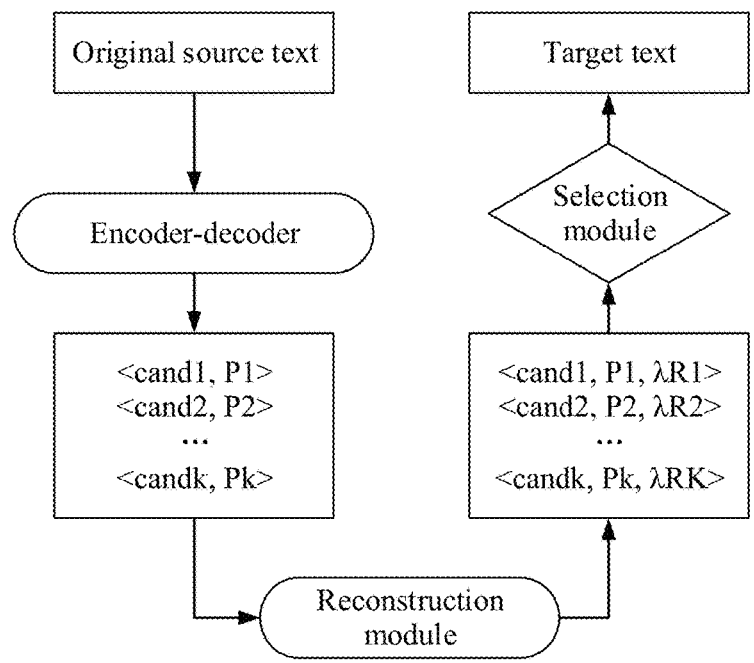
FIG. 4
FIG. 5

TEXT TRANSLATION METHOD AND APPARATUS, STORAGE MEDIUM, AND COMPUTER DEVICE

CROSS REFERENCE TO RELATED APPLICATIONS

This application is a continuation application of PCT Patent Application No. PCT/CN2019/093337, entitled "TEXT TRANSLATION METHOD AND APPARATUS, STORAGE MEDIUM AND COMPUTER DEVICE" filed on Jun. 27, 2019, which claims priority to Chinese Patent Application No. 201811033545.7, filed with the State Intellectual Property Office of the People's Republic of China on Sep. 5, 2018, and entitled "MACHINE TRANSLATION METHOD AND APPARATUS, STORAGE MEDIUM, AND COMPUTER DEVICE", all of which are incorporated by reference in their entirety.

FIELD OF THE TECHNOLOGY

This application relates to the field of machine learning technologies, and in particular, to a machine translation method and apparatus, a storage medium, and a computer device.

BACKGROUND OF THE DISCLOSURE

Machine translation is to translate one natural language text (the natural language text to be translated is generally referred to as a source text) into another natural language text (the translated natural language text is referred to as a target text), to implement conversion between texts in different languages. Since different languages have different syntax and sentence habits, for example, in languages such as Chinese and Japanese, pronoun dropping is extremely common; in contrast, a pronoun is indispensable as a sentence component in languages such as English and French. In translation from a pro-drop language (for example, Chinese) to a non-pro-drop language (for example, English), implied pronouns need to be recalled and correctly translated, bringing a great challenge to the machine translation.

Using translation from Chinese to English as an example, to reduce the influence caused by dropped pronouns, dropped pronouns in Chinese sentences are automatically marked by using differences between pronoun omissions in Chinese and English in a parallel corpus. Then, a dropped pronoun restoration system based on a neural network is trained by using the corpus, processing of restoring the dropped pronouns is performed on a to-be-translated Chinese sentence by using a trained dropped pronoun restoration system, and the processed to-be-translated sentence (a sentence of which the dropped pronouns are supplemented) is then transmitted to a statistical machine translation system for translation.

In a conventional machine translation manner, an erroneous transmission is generally caused by low accuracy of a dropped pronoun restoration system. As a result, a translation result error is caused by addition of an incorrect pronoun to a source, leading to a problem of low accuracy in machine translation.

SUMMARY

Embodiments of this application provide a machine translation method and apparatus, a storage medium, and a computer device, which may be used for resolving the technical problem of low accuracy in machine translation.

A machine translation method is applied to a computer device, the method including:
    obtaining an original source text and a reconstructed source text, the reconstructed source text being a source text obtained by supplementing the original source text with dropped word location information;
    performing semantic encoding on the original source text, to obtain a source vector sequence corresponding to the original source text;
    sequentially decoding the source vector sequence to obtain target vectors, further including: performing decoding on the source vector sequence at a current time according to a word vector of a candidate target word determined at a previous time, and determining a candidate target word at the current time according to a target vector at the current time;
    forming a target vector sequence using the target vectors obtained through the sequential decoding;
    performing reconstruction assessment on the source vector sequence and the target vector sequence according to the reconstructed source text, to obtain reconstruction scores corresponding to the candidate target words; and
    generating a target text according to the reconstruction scores and the candidate target words.

A non-transitory computer-readable storage medium, stores computer-readable instructions that, when executed by a processor of a computer device, causing the computer device to perform steps of the machine translation method.

A computer device, includes a memory and a processor, the memory storing a plurality of computer programs, the computer programs, when executed by the processor, causing the computer device to perform steps of the machine translation method.

According to the foregoing machine translation method and apparatus, the computer-readable storage medium, and the computer device, semantic encoding is performed on an original source text to obtain a source vector sequence corresponding to the original source text, the source vector sequence is then sequentially decoded to obtain target vectors, decoding at each time is performed according to a word vector of a candidate target word determined at a previous time, and a candidate target word at a current time is determined according to a target vector at the current time. In this way, a candidate target word generated through decoding not only includes semantic information of the source text, but also integrates semantic information of a candidate target word at a previous time, so that a finally generated target text is more coherent, and a translation result is more accurate. A target vector sequence is formed by the target vectors obtained through sequential decoding, and reconstruction assessment processing is performed on the source vector sequence and the target vector sequence according to the reconstructed source text obtained by supplementing the original source text with the dropped word location information, to obtain reconstruction scores corresponding to the candidate target words, and then a target text is generated according to the reconstruction scores and the candidate target words. In this way, by combining source hidden layer vector features and target hidden layer vector features, common information of the two ends may be shared, redundant information during reconstruction assessment processing may be reduced, and the loss of important information may be avoided, so that a recall degree of dropped word information can be well evaluated through the reconstruction score. In this way, the target text is generated according to the reconstruction scores and the candidate target words, so that influence caused by omission of pronouns during translation may be reduced, and the translation quality is greatly improved.

BRIEF DESCRIPTION OF THE DRAWINGS

FIG. 3 is a schematic diagram of an example of pronoun dropping in Chinese expressions according to an exemplary embodiment.

FIG. 4 is a schematic structural diagram of dropped pronoun restoration according to an exemplary embodiment.

FIG. 5 is a schematic flowchart of translating an original source text by using a machine translation model to obtain a target text according to an exemplary embodiment.

DESCRIPTION OF EMBODIMENTS

To make objectives, technical solutions, and advantages of this application clearer and more understandable, this application is further described in detail below with reference to the accompanying drawings and the embodiments. It is to be understood that the specific embodiments described herein are merely used for explaining this application, but are not intended to limit this application.

Figure 1:
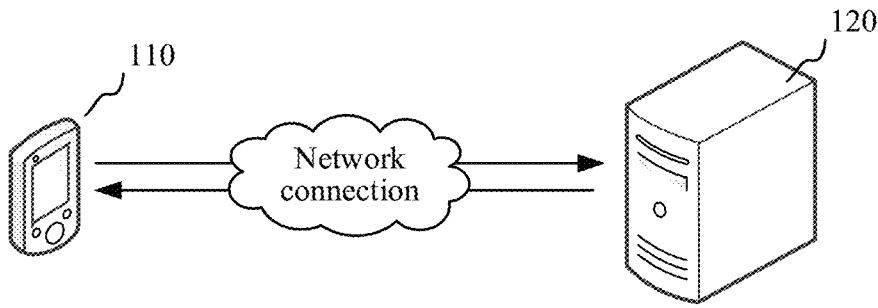
FIG. 1 is a diagram showing an application environment of a machine translation method according to an exemplary embodiment.

FIG. 1 is a diagram showing an application environment of a machine translation method according to an exemplary embodiment. Referring to FIG. 1, the machine translation method is applied to a machine translation system. The machine translation system includes a terminal 110 and a server 120. The terminal 110 may obtain an original source text and transmit the original source text to the server 120. The server 120 determines a reconstructed source text according to the original source text, performs the machine translation method to obtain a target text, and then returns the target text to the terminal 110. The terminal 110 may alternatively obtain the target text by performing the machine translation method after obtaining the original source text. The terminal 110 is connected to the server 120 through a network. The terminal 110 may be specifically a desktop terminal or a mobile terminal, and the mobile terminal may be at least one of a mobile phone, a tablet computer, a notebook computer, and the like. The server 120 may be implemented by an independent server, a server cluster that includes a plurality of servers, or a cloud service.

Figure 2:
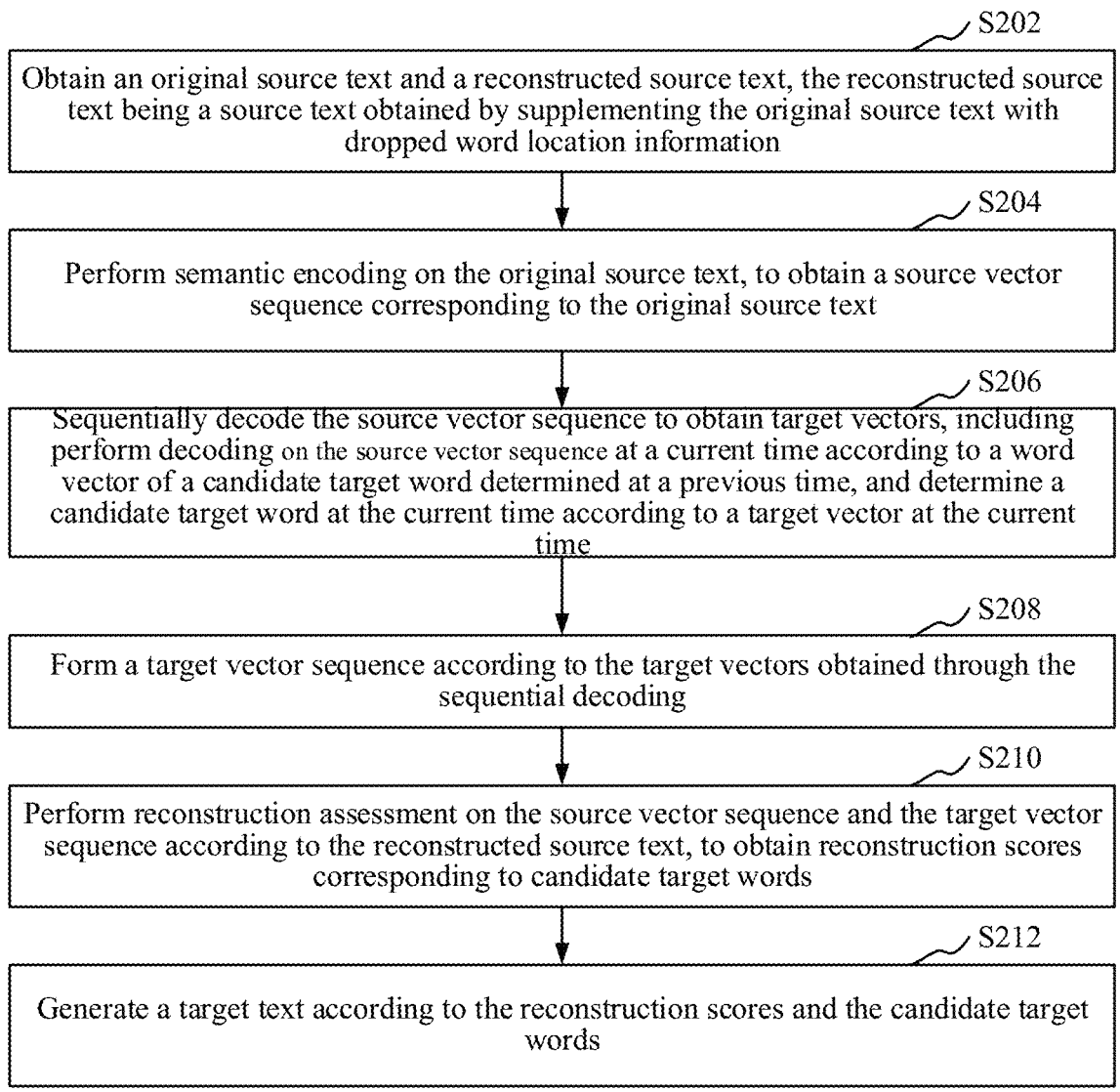
FIG. 2 is a schematic flowchart of a machine translation method according to an exemplary embodiment.

As shown in FIG. 2, in an embodiment, a machine translation method is provided. This embodiment is mainly described by using an example that the method is applied to a computer device. The computer device may be the terminal 110 or the server 120 in FIG. 1. Referring to FIG. 2, the machine translation method includes at least the following steps:

S202: Obtain an original source text and a reconstructed source text, the reconstructed source text being a source text obtained by supplementing the original source text with dropped word location information.

The original source text is an original text to be translated. The reconstructed source text is a source text obtained by supplementing the original source text with dropped word location information. The supplementing the original source text with dropped word location information refers to determining locations of dropped words in the original source text, and supplementing corresponding location information to the original source text.

Optionally, the original source text is a text expressed by using a pro-drop language.

The dropped word is a word omitted in language expressions, and generally refers to a dropped pronoun (DP). In specific language (for example, Chinese and Japanese) expressions, some pronouns are generally omitted to make the expressions more concise. Although the pronouns are omitted, missing information (that is, the dropped pronouns and antecedents referred to by the dropped pronouns) may be inferred according to the context, so that such expressions do not affect understanding of people on content. This phenomenon belongs to the scope of zero anaphora or empty anaphora in a chapter theory. FIG. 3 is a schematic diagram of an example of pronoun dropping in Chinese expressions according to an exemplary embodiment. As shown in FIG. 3, subject pronouns "你" and "我", and an object pronoun "它" that are located in brackets on the Chinese side are all omitted (characters in the brackets are omitted), but corresponding pronouns on the English side are not omitted.

Refer to FIG. 4 for a step of supplementing dropped word location information of the original source text. FIG. 4 is a schematic structural diagram of dropped pronoun restoration according to an exemplary embodiment. As shown in FIG. 4, in an upper part of FIG. 4, after dropped pronoun restoration is performed on a pro-drop sentence "喜欢这块蛋糕吗？很喜欢。你烤的吗？", a sentence "你喜欢这块蛋糕吗？我很喜欢它。你烤的它吗？" is obtained. It is to be understood that, a location relationship between restored dropped pronouns and other words in the source text is the dropped word location information in this application. Accordingly, refer to a lower part of FIG. 4, after anaphora resolution is performed on a pro-drop sentence "喜欢这块蛋糕吗？很喜欢。你烤的吗？", a sentence "Ø喜欢这块蛋糕吗？Ø很喜欢Ø。你烤的Ø吗？" is obtained. Ø is a reference character used for supplementing dropped word location information of the original source text, and the text "Ø喜欢这块蛋糕吗？Ø很喜欢Ø。你烤的Ø吗？" obtained after the anaphora resolution is a reconstructed source text.

The source text may be specifically a text such as a sentence, a paragraph, or a chapter. The source text may be a Chinese text, or may be a Japanese text. In an exemplary embodiment, the computer device may perform word segmentation to obtain a word sequence formed by various words. Word segmentation for a Chinese source text may be performed in a dictionary-based or statistics-based word segmentation manner.

The computer device may directly obtain the original source text and the reconstructed source text, and perform word segmentation on the original source text and the reconstructed source text, to obtain corresponding word sequences. The computer device may alternatively receive word sequences generated by another computer device according to the original source text and the reconstructed source text.

In an exemplary embodiment, after obtaining the word sequence of the original source text, the computer device may perform word embedding processing to convert a discrete word sequence into a continuous spatial representation vector sequence. The spatial representation vector sequence is then inputted into an input layer of a pre-trained machine translation model, and the machine translation method is performed by using the pre-trained machine translation model, to obtain a target text.

In an exemplary embodiment, the computer device may mark location information of dropped pronouns in the original source text through a pre-trained dropped pronoun restoration model. First, the computer device may construct a parallel corpus according to a sample source text and a sample reference text in a sample library. Dropped pronouns in the sample source text are automatically marked by using a word alignment algorithm with the help of a difference between pronoun omissions in the sample source text and the sample reference text in the parallel corpus (for example, pronouns in a Chinese sentence are omitted, but pronouns in a corresponding English sentence are not omitted). In this way, a large-scale dropped pronoun corpus of the source text may be quickly constructed without manual marking, for example, a "source Chinese-Chinese in which locations of dropped pronouns are automatically supplemented-target English" ternary correspondence corpus. A dropped pronoun restoration model based on a neural network is then trained by using the corpus, and locations of dropped pronouns in the original source text can be nicely predicted by the trained dropped pronoun restoration model. In this way, the computer device may add reference characters to the locations of the dropped pronouns to obtain a reconstructed source text.

S204: Perform semantic encoding on the original source text, to obtain a source vector sequence corresponding to the original source text.

The semantic encoding on the original source text is a process of converting the original source text into vectors. The source vector sequence is a vector sequence obtained after performing semantic encoding on a word sequence of the original source text. Specifically, the computer device may perform word segmentation on the original source text, to obtain the word sequence. Then, the computer device performs semantic encoding on words in the original source text and extracts semantic features of the words, to convert the words into vector representations. The computer device finally splices the vector representations corresponding to the words to obtain the source vector sequence.

In an exemplary embodiment, the computer device may perform word segmentation on the original source text, to obtain the word sequence of the original source text. The computer device may perform word embedding processing to convert a discrete word sequence into a continuous spatial representation vector sequence. The computer device then inputs the spatial representation vector sequence into a machine translation model, to perform semantic encoding processing on the spatial representation vector sequence corresponding to the original source text by using an encoder in the machine translation model, to obtain the source vector sequence. Source vectors in the source vector sequence correspond to the words in the word sequence of the original source text respectively.

The machine translation model adopts a Sequence-to-Sequence framework based on a neural network. The Sequence-to-Sequence framework is a framework including an Encoder-Decoder structure. In the Encoder-Decoder structure, an inputted sequence is converted into another sequence for output. In the framework, the encoder converts an inputted sequence into vectors, and the decoder receives the vectors and sequentially generates an output sequence in chronological order. The encoder and the decoder may be neural network models of the same type, or may be neural network models of different types. For example, the neural network model may be a convolutional neural network (CNN) model, a recurrent neural network (RNN) network, a long short-term memory (LS™) model, a time delay network model, or a gate controlled convolutional neural network model.

In an exemplary embodiment, the computer device may input the word sequence of the original source text into the input layer of the encoder in the machine translation model, and perform semantic encoding processing by using hidden layers in the encoder, to obtain a vector sequence outputted by the hidden layers. The hidden layer is a term in the neural network model, and is an intermediate layer relative to an input layer and an output layer. The hidden layer includes model parameters obtained by training the neural network model. The hidden layer of the encoder herein is an intermediate layer relative to the input layer of the encoder and an output layer of the encoder. The hidden layer of the encoder may include a plurality of neural network layers. The hidden layer of the encoder is described as a "black box" herein.

Description is made by using an example in which the word sequence of the original source text is a sequence having a length of m, the word sequence of the original source text is inputted into the encoder for semantic encoding, to obtain vectors corresponding to the words in the word sequence. A processing process of the encoder may be as follows:

The computer device may perform word segmentation on the original source text, to obtain a word sequence $x=(x_1, x_2, \ldots, x_m)$ of the original source text, and convert the word sequence into continuous spatial representation vectors through word embedding, which may be denoted by $p=(p_1, p_2, \ldots, p_m)$. The computer device performs semantic encoding on the spatial representation vectors through a neural network of the encoder, to obtain the source vector sequence, which may be denoted by $H=(h_1, h_2, \ldots, h_m)$.

S206. Sequentially decode the source vector sequence to obtain target vectors, including perform decoding on the source vector sequence at a current time according to a word vector of a candidate target word determined at a previous time, and determine a candidate target word at the current time according to a target vector at the current time.

The decoding is a process of converting vectors into a sequence for output. The target vector is a vector obtained by decoding the corresponding source vector of the original source text. Specifically, when the computer device is to generate a candidate target word at a current time (which may also be referred to as a current moment), the computer device may obtain a word vector of a candidate target word outputted at a previous time (which may also be referred to as a previous moment), decode the source vector sequence according to the word vector of the candidate target word outputted at the previous time, to obtain a target vector at the current time, and then determine the candidate target word outputted at the current time according to the target vector at the current time. In this way, the target vector at the current time not only includes semantic information of the words in the word sequence of the original source text, but also integrates semantic information of the candidate target word outputted at the previous time, so that the finally generated target text is more coherent and includes richer information.

In an exemplary embodiment, the computer device may perform word embedding processing on the candidate target word, to convert the candidate target word into a spatial representation vector represented by using a real number.

In an exemplary embodiment, the computer device may decode the source vector sequence by using a decoder in a pre-trained machine translation model, to obtain a target vector sequence. The machine translation model may input the source vector sequence into a hidden layer of the decoder to calculate target vectors. The hidden layer of the decoder herein is an intermediate layer relative to an input layer of the decoder and an output layer of the decoder. The hidden layer of the decoder may include a plurality of neural network layers. The hidden layer of the decoder is described as a "black box" herein. In an exemplary embodiment, a hidden layer state vector of the decoder at an initial moment may be a model parameter obtained through model training, or may be a default model parameter.

In an exemplary embodiment, there may be one or more candidate target words determined by the computer device according to the target vector. The decoder may calculate an output probability sequence at a current time (which may also be referred to as a current moment) according to a target vector at the current time (which may also be referred to as the current moment). The output probability sequence determined at the current time by the machine translation model may be a sequence formed by probabilities of candidate words in a word set of an output end being the target word outputted at the current time. Further, the machine translation model may select a candidate word corresponding to a maximum probability in the output probability sequence as a candidate target word at the current time. The machine translation model may alternatively select candidate words corresponding to the top several (for example, the top ten) probabilities in the output probability sequence as candidate target words at the current time.

In an exemplary embodiment, the decoder may determine a translation score sequence at the current time according to the target vector at the current time. The translation score sequence determined at the current time by the machine translation model is a sequence of translation scores corresponding to the candidate words in the word set of the output end. The translation score is used for evaluating translation accuracy of the candidate word being used as the target word. A higher translation score corresponding to the candidate word indicates a higher probability of the candidate word being used as the target word. Further, the machine translation model may select a candidate word corresponding to a maximum score in the translation score sequence as the candidate target word at the current time. The machine translation model may alternatively select candidate words corresponding to the top several (for example, the top ten) scores in the translation score sequence as candidate target words at the current time.

When there are a plurality of candidate target words, the computer device may perform word embedding processing on the plurality of candidate target words respectively, to convert the candidate target words into spatial representation vectors represented by using real numbers. Vector weighting processing is performed on the spatial representation vectors corresponding to the plurality of candidate target words, to obtain word vectors corresponding to the candidate target words. In another exemplary embodiment, the computer device may select one candidate target word with a highest output probability/translation score from the plurality of candidate target words, or randomly select one candidate target word from the plurality of candidate target words, and perform word embedding processing on the candidate target word, to convert the candidate target word into a spatial representation vector represented by using a real number.

In an exemplary embodiment, the computer device may calculate the translation scores corresponding to the candidate target words by using the following formula:

$$P(y \mid x) = \prod_{i=1}^{I} g(y_{i-1}, s_i, c_i).$$

$y_{i-1}$ is the candidate target word obtained through decoding by the decoder at the previous time; $s_i$ is the target vector at the current time; $c_i$ is a content vector at the current time obtained after attention mechanism processing of the current time is performed on the source vector sequence; g represents a softmax function; and $\Pi(\ )$ function represents continued multiplication.

In an exemplary embodiment, step S206 includes: sequentially obtaining an attention distribution weight vector corresponding to the source vector sequence at the current time; calculating a content vector at the current time according to the attention distribution weight vector and the source vector sequence; and sequentially calculating the target vector at the current time according to the content vector at the current time, a target vector at the previous time, and the word vector of the candidate target word determined at the previous time, and determining the candidate target word at the current time according to the target vector at the current time.

In an exemplary embodiment, before the computer device generates the candidate target word at the current time (which is also referred to as the current moment), the computer device may obtain an attention distribution weight vector at the current time (which is also referred to as the current moment) corresponding to the source vector sequence. The attention distribution weight vector at the current time may be determined according to the source vector sequence and a target vector sequence at the previous time (previous moment) in the decoder. Specifically, refer to the following formula:

$$\alpha_{i,j} = \frac{\exp(e_{i,j})}{\sum_{k=1}^{T_x} \exp(e_{i,k})}; e_{i,j} = ATT(s_{i-1}, h_j).$$

i refers to an $i^{th}$ time, j refers to a $j^{th}$ vector in the source vector sequence, $\alpha_{i,j}$ refers to an attention distribution weight corresponding to the $j^{th}$ vector in the source vector sequence at the $i^{th}$ time. The attention distribution weight vector at the current time corresponding to the source vector sequence may be obtained by splicing attention distribution weights corresponding to the vectors in the source vector sequence at each time.

Further, the computer device may calculate a content vector at the current time according to the attention distribution weight vector at the current time and the source vector sequence. For example, the attention distribution weight vector at the current time may be represented by $\alpha_{i,j}=\{\alpha_1, \alpha_2, \ldots, \alpha_j\}$. The source vector sequence may be represented by $H=\{h_1, h_2, \ldots, h_1\}$, and the content vector at the current time may be calculated by using the following formula: $c_i=\Sigma_{j=1}^{J}\alpha_{i,j}\cdot h_j$. Accordingly, the content vector at each time may be calculated by using the above formula.

Further, the computer device may sequentially calculate the target vector at the current time according to the content vector at the current time, the target vector at the previous time, and the word vector of the candidate target word determined at the previous time, and determine the candidate target word at the current time according to the target vector at the current time. For example, the target vector at the current time may be represented by $s_i$, the candidate target word at the previous time may be represented by $y_{i-1}$, and the content vector at the current time may be represented by $c_i$; in this case, $s_i=f(s_{i-1},y_{i-1},c_i)$, where f( ) represents an activation function. Accordingly, the target vector at each time may be calculated by using the above formula. Further, the candidate target word at the current time may be determined through calculation by using the following formula: $y_i=g(y_{i-1},s_1, c_i)$, where g( ) is a softmax function.

It is to be understood that, a manner in which the decoder obtains the candidate target word through decoding for the first time is the same as the manner used at later moments, and corresponding data at a previous time that required for the first decoding may be an initial value preset according to experience or an initial value generated randomly, so as to perform subsequent processing.

It is to be understood that, the "current time" or the "current moment" used in this application is used for describing a moment at which the decoder of the machine translation model decodes and determines the target word at the current time, and the "previous time" or the "previous moment" is used for describing a moment at which the decoder decodes and determines the target word at the previous time. For example, if the previous time is an $i-1^{th}$ time, and target word outputted by the machine translation model is $y_{i-1}$; and if the current time is the $i^{th}$ time, the target word outputted by the machine translation model is $y_i$. In addition, the current time changes relatively. For example, when the machine translation model outputs a target word at a next time i+1 of the current time, the next time i+1 is used as a new current time, and the current time i is used as a new previous time.

In the foregoing exemplary embodiment, the content vector at the current time is calculated according to the attention distribution weight vector at the current time and the source vector sequence, then the target vector at the current time is calculated according to the content vector at the current time, the target vector at the previous time, and the word vector of the candidate target word determined at the previous time, and the candidate target word at the current time is determined according to the target vector at the current time. In this way, through the attention mechanism processing, the target vector at the current time includes semantic information that is more important for the current time in the original source text, and also includes the semantic information of the candidate target word outputted at the previous time, so that the finally generated target text is more coherent and includes richer information.

S208: Form a target vector sequence according to the target vectors obtained through the sequential decoding.

Specifically, the computer device may splice the target vectors according to a sequence in which the target vectors are decoded, to obtain a target vector sequence.

S210: Perform reconstruction assessment on the source vector sequence and the target vector sequence according to the reconstructed source text, to obtain reconstruction scores corresponding to the candidate target words.

The reconstruction assessment processing is to reconstruct, according to the source vector sequence and the target vector sequence, the source text in which the dropped word location information is marked, and compare the source text with the inputted reconstructed source text, to evaluate a reconstruction capability of reconstructing the source text according to the source vector sequence and the target vector sequence. The reconstruction score is a score used for evaluating a recall degree of dropped pronoun information.

Specifically, the computer device may reconstruct, according to the source vector sequence and the target vector sequence, a source text in which dropped word location information is marked, and the source text herein is referred to as an estimated reconstructed source text. By comparing differences between the obtained reconstructed source text and the estimated reconstructed source text, the reconstruction scores corresponding to the candidate target words may be calculated. The reconstruction score is used for evaluating the translation quality of the candidate target words, and a higher reconstruction score indicates a higher probability of the candidate target word being used as the target word.

In an exemplary embodiment, when there are a plurality of candidate target words determined according to the target vector sequence at each time, the reconstruction score corresponding to the candidate target words is a numerical matrix corresponding to the number of times of decoding and the quantity of candidate target words obtained through decoding at each time.

In an exemplary embodiment, the machine translation method may be performed by using a pre-trained machine translation model. The computer device may input the source vector sequence and the target vector sequence into a reconstruction module of the machine translation model, to reconstruct, by using the reconstruction module and based on a hidden layer vector sequence of the encoder end and a hidden layer vector sequence of the decoder end, a source language sentence in which dropped word location information is automatically marked. The process is equal to an auto-encoder operation, and it is assumed that the process may allow the source vector sequence and the target vector sequence to learn the dropped pronoun location information. The reconstruction module may be formed by a deep neural network.

S212: Generate a target text according to the reconstruction scores and the candidate target words.

The target text is a text obtained by performing machine translation on the original source text. The target text and the original source text are texts in different languages. Specifically, the computer device may splice the candidate target words according to the reconstruction scores corresponding to the candidate target words, to obtain the target text.

Optionally, the target text is a text expressed by using a non-pro-drop language.

In an exemplary embodiment, when the computer device determines the candidate target word at the current time according to the target vector at the current time, the computer device also determines the translation scores corresponding to the candidate target words. The translation score is used for evaluating translation accuracy of the candidate word being used as the target word. A higher translation score corresponding to the candidate word indicates a higher probability of the candidate word being used as the target word. Further, the computer device may calculate a weighted sum of a translation score and a reconstruction score of each candidate target word according to the translation score and the reconstruction score corresponding to the candidate target word generated through decoding at each time. A candidate target word obtained through decoding and having a greatest weighted sum at each time is used as the target word. The target words are spliced according to a generating sequence of the target words, to obtain the target text.

In an exemplary embodiment, step S212 includes: generating candidate target texts according to the candidate target words; and screening out the target text corresponding to the original source text from the candidate target texts according to the translation scores and the reconstruction scores.

Specifically, after the computer device obtains the candidate target word at each time through decoding, the computer device may generate a plurality of candidate target texts according to the candidate target words in a beam search manner. Further, the computer device may calculate weighted scores of the candidate target texts according to the translation score and the reconstruction score corresponding to each candidate target word in the candidate target texts. Then, the computer device selects a candidate target text having a highest weighted score as the target text corresponding to the original source text. In this way, the target text may be screened out from the candidate target texts according to the translation scores and the reconstruction scores, so that a key problem of pronoun dropping in the source text may be greatly alleviated, and the translation accuracy is greatly improved.

FIG. 5 is a schematic flowchart of translating an original source text by using a machine translation model to obtain a target text according to an exemplary embodiment. As shown in FIG. 5, the computer device may input an original source text (source sentence) into an encoder-decoder of the machine translation model, to obtain candidate target texts $\{cand_1, cand_2, \ldots, cand_k\}$, and translation scores $\{P_1, P_2, \ldots, P_k\}$ corresponding to the candidate target texts. The translation score corresponding to the candidate target text may be obtained by adding up translation scores corresponding to candidate target words in the candidate target text. The reconstructed source text, the source vector sequence, and the target vector sequence are then inputted into the reconstruction module of the machine translation model for reconstruction assessment processing, to obtain the reconstruction scores corresponding to the candidate target words. Accordingly, the computer device may calculate the reconstruction scores $\{R_1, R_2, \ldots, R_k\}$ corresponding to the candidate target texts according to the reconstruction scores corresponding to the candidate target words. The computer device may calculate a weighted sum of the translation score and the reconstruction score of each candidate target text, such as $y=R_1+\lambda R_1$, where $\lambda$ is a weighting coefficient. A candidate target text corresponding to a maximum value in results obtained through weighed summation is outputted as the target text by using a selection module.

According to the foregoing machine translation method, semantic encoding is performed on an original source text to obtain a source vector sequence corresponding to the original source text, the source vector sequence is then sequentially decoded to obtain target vectors, decoding at each time is performed according to a word vector of a candidate target word determined at a previous time, and a candidate target word at a current time is determined according to a target vector at the current time. In this way, a candidate target word generated through decoding not only includes semantic information of the source text, but also integrates semantic information of a candidate target word at a previous time, so that a finally generated target text is more coherent, and a translation result is more accurate. A target vector sequence is formed by the target vectors obtained through sequential decoding, and reconstruction assessment processing is performed on the source vector sequence and the target vector sequence according to the reconstructed source text obtained by supplementing the original source text with the dropped word location information, to obtain reconstruction scores corresponding to the candidate target words, and then a target text is generated according to the reconstruction scores and the candidate target words. In this way, by combining source hidden layer vector features and target hidden layer vector features, common information of the two ends may be shared, redundant information during reconstruction assessment processing may be reduced, and the loss of important information may be avoided, so that the translation quality of the candidate target word can be well evaluated through the reconstruction score. In this way, because the target text is generated according to the reconstruction scores and the candidate target words, influence caused by omission of pronouns during translation may be reduced, and the translation quality is greatly improved.

In an exemplary embodiment, step S202, that is, the step of obtaining an original source text and a reconstructed source text specifically includes: obtaining the original source text; determining a location of a dropped word in the original source text through a pre-trained dropped word restoration model; and adding a reference character to the location of the dropped word to obtain the reconstructed source text.

The reference character refers to a symbol used for indicating a dropped word, which, for example, may specifically be a symbol "Ø", "#DP #", or "&", to replace a pronoun dropped in the original source text. Specifically, the computer device may predict a location of the dropped word in the original source text by using a pre-trained dropped word restoration model, and then add a reference character to the location of the dropped word in the original source text to obtain a reconstructed source text.

For example, after dropped word location information is supplemented in a pro-drop sentence "喜欢这块蛋糕吗？很喜欢。你烤的吗？", a sentence "Π 喜欢这块蛋糕吗?Ø 很喜欢Ø。你烤的Ø 吗?" is obtained, where ¢ is a reference character used for supplementing the original source text with the dropped word location information. A sentence "Ø 喜欢这块蛋糕吗?Ø 很喜欢Ø。你烤的Ø 吗?" is a reconstructed source text obtained by supplementing the original source text with the dropped word location information.

In an exemplary embodiment, the computer device may mark location information of dropped pronouns in the original source text through a pre-trained dropped pronoun restoration model. First, the computer device may construct a parallel corpus according to a sample source text and a sample reference text in a sample library. Dropped pronouns in the sample source text are automatically marked by using a word alignment algorithm with the help of a difference between pronoun omissions in the sample source text and the sample reference text in the parallel corpus (for example, pronouns in a Chinese sentence are omitted, but pronouns in a corresponding English sentence are not omitted). In this way, a large-scale dropped pronoun corpus of the source text may be quickly constructed without manual marking, for example, a "source Chinese-Chinese in which locations of dropped pronouns are automatically supplemented-target English" ternary correspondence corpus. A dropped pronoun restoration model based on a neural network is then trained by using the corpus, and locations of dropped pronouns in the original source text can be nicely predicted by the trained dropped pronoun restoration model. In this way, the computer device may add reference characters to the locations of the dropped pronouns to obtain a reconstructed source text.

Experiments show that a model effect of training a machine learning model to enable the machine learning model to have a capability of predicting dropped word location information is much better than a model effect of enabling the machine learning model to have a capability of restoring dropped words. That is, by training a dropped word restoration model, the dropped word restoration model can accurately predict locations of dropped words in an original source text. In this way, the translation quality may be further improved with the assistance of the reconstructed source text.

In the foregoing exemplary embodiment, a location of a dropped word in the original source text is determined through a pre-trained dropped word restoration model, and a reference character is added to the location of the dropped word to obtain the reconstructed source text. The reconstructed source text may be quickly and accurately constructed by using the pre-trained dropped word restoration model.

In an exemplary embodiment, the machine translation method further includes a step of respectively performing attention mechanism processing on the source vector sequence and the target vector sequence, and the step specifically includes: obtaining a source attention distribution weight vector corresponding to the source vector sequence; calculating a source content vector according to the source attention distribution weight vector and the source vector sequence; obtaining a target attention distribution weight vector corresponding to the target vector sequence; and calculating a target content vector according to the target attention distribution weight vector and the target vector sequence. Step S210, that is, a step of performing reconstruction assessment processing on the source vector sequence and the target vector sequence according to the reconstructed source text, to obtain reconstruction scores corresponding to the candidate target words includes: performing reconstruction assessment processing on the source content vector and the target content vector according to the reconstructed source text, to obtain the reconstruction scores corresponding to the candidate target words.

In an exemplary embodiment, in the process that the computer device performs attention mechanism processing on the source vector sequence and the target vector sequence, independent attention mechanism processing or crossed attention mechanism processing may be performed. The independent attention mechanism processing means that attention weights for performing the attention mechanism processing on the source vector sequence and the target vector sequence are independently calculated; and the crossed attention mechanism processing means that attention weights for performing the attention mechanism processing on the source vector sequence and the target vector sequence are calculated in a crossed manner.

In an exemplary embodiment, the step of obtaining a source attention distribution weight vector corresponding to the source vector sequence includes: performing first attention mechanism processing on a word vector of a previous word of a current word in the reconstructed source text, a hidden layer state vector corresponding to the previous word in the reconstructed source text, and the source vector sequence, to obtain the source attention distribution weight vector corresponding to the source vector sequence; or performing second attention mechanism processing on a word vector of a previous word of a current word in the reconstructed source text, a hidden layer state vector corresponding to the previous word in the reconstructed source text, the source vector sequence, and the target content vector, to obtain the source attention distribution weight vector corresponding to the source vector sequence.

In an exemplary embodiment, the step of obtaining a target attention distribution weight vector corresponding to the target vector sequence includes: performing first attention mechanism processing on a word vector of a previous word of a current word in the reconstructed source text, a hidden layer state vector corresponding to the previous word in the reconstructed source text, and the target vector sequence, to obtain the target attention distribution weight vector corresponding to the target vector sequence; or performing second attention mechanism processing on a word vector of a previous word of a current word in the reconstructed source text, a hidden layer state vector corresponding to the previous word in the reconstructed source text, the target vector sequence, and the source content vector, to obtain the target attention distribution weight vector corresponding to the target vector sequence.

In an exemplary embodiment, the quantity of words in a word sequence of a reconstructed text is used as a standard number of times, w. When the computer device performs the first attention mechanism processing on the word vector of the previous word of the current word in the reconstructed source text, the hidden layer state vector corresponding to the previous word in the reconstructed source text, and the source vector sequence to obtain the source attention distribution weight vector at the current time corresponding to the source vector sequence; and performs the first attention mechanism processing on the word vector of the previous word of the current word in the reconstructed source text, the hidden layer state vector corresponding to the previous word in the reconstructed source text, and the target vector sequence to obtain the target attention distribution weight vector at the current time corresponding to the target vector sequence, it may be considered that the computer device performs independent attention mechanism processing on the source vector sequence and the target vector sequence.

For example, the computer device may calculate a source attention distribution weight by using the following formula:

$$\hat{\alpha}_{i,j}^{enc} = ATT(\hat{x}_{i-1}, h_{i-1}^{rec}, h_j^{enc}),$$

where ATT represents attention mechanism processing; $\hat{x}_{i-1}$ represents a word vector of an $i-1^{th}$ word in the reconstructed source text; $h_{i-1}^{rec}$ represents a hidden layer state vector corresponding to the word vector of the $i-1^{th}$ word in the reconstructed source text, namely, the hidden layer state vector outputted by the reconstruction module; and $h_j^{enc}$ represents each source vector. The computer device may calculate a target attention distribution weight by using the following formula:

$$\hat{\alpha}_{i,j}^{dec} = ATT(\hat{x}_{i-1}, h_{i-1}^{rec}, h_j^{dec}),$$

where ATT represents attention mechanism processing; $\hat{x}_{i-1}$ represents a word vector of an $i-1^{th}$ word in the reconstructed source text; $h_{i-1}^{rec}$ represents a hidden layer state vector corresponding to the word vector of the $i-1^{th}$ word in the reconstructed source text, namely, the hidden layer state vector outputted by the reconstruction module; and $h_j^{dec}$ represents each target vector.

In an exemplary embodiment, the quantity of words in a word sequence of a reconstructed text is used as a standard number of times. When the computer device performs the first attention mechanism processing on the word vector of the previous word of the current word in the reconstructed source text, the hidden layer state vector corresponding to the previous word in the reconstructed source text, and the source vector sequence to obtain the source attention distribution weight vector at the current time corresponding to the source vector sequence; and performs the second attention mechanism processing on the word vector of the previous word of the current word in the reconstructed source text, the hidden layer state vector corresponding to the previous word in the reconstructed source text, the target vector sequence, and the source content vector to obtain the target attention distribution weight vector at the current time corresponding to the target vector sequence, it may be considered that the computer device performs crossed attention mechanism processing on the source vector sequence and the target vector sequence.

For example, the computer device may calculate a source attention distribution weight by using the following formula:

$$\hat{\alpha}_{i,j}^{enc} = ATT(\hat{x}_{i-1}, h_{i-1}^{rec}, h_j^{enc}),$$

where ATT represents attention mechanism processing; $\hat{x}_{i-1}$ represents a word vector of an $i-1^{th}$ word in the reconstructed source text; $h_{i-1}^{rec}$ represents a hidden layer state vector corresponding to the word vector of the $i-1^{th}$ word in the reconstructed source text, namely, the hidden layer state vector outputted by the reconstruction module; and $h_j^{enc}$ represents each source vector. The computer device may calculate a target attention distribution weight by using the following formulas:

$$\hat{\alpha}_{i,j}^{dec} = ATT(\hat{x}_{i-1}, h_{i-1}^{rec}, h_j^{dec}, \hat{c}_i^{enc}), \hat{c}_i^{enc} = \sum_{j=1}^{J} \hat{\alpha}_{i,j}^{enc} \cdot h_j^{enc},$$

where ATT represents attention mechanism processing; $\hat{x}_{i-1}$ represents a word vector of an $i-1^{th}$ word in the reconstructed source text; $h_{i-1}^{rec}$ represents a hidden layer state vector corresponding to the word vector of the $i-1^{th}$ word in the reconstructed source text, namely, the hidden layer state vector outputted by the reconstruction module; $h_j^{dec}$ represents each target vector; and • represents point multiplication of vectors.

In an exemplary embodiment, the quantity of words in a word sequence of a reconstructed text is used as a standard number of times. When the computer device performs the first attention mechanism processing on the word vector of the previous word of the current word in the reconstructed source text, the hidden layer state vector corresponding to the previous word in the reconstructed source text, the source vector sequence, and the target content vector to obtain the source attention distribution weight vector at the current time corresponding to the source vector sequence; and performs the first attention mechanism processing on the word vector of the previous word of the current word in the reconstructed source text, the hidden layer state vector that is outputted by the reconstruction module and that corresponds to the previous word in the reconstructed source text, and the target vector sequence to obtain the target attention distribution weight vector at the current time corresponding to the target vector sequence, it may be considered that the computer device performs crossed attention mechanism processing on the source vector sequence and the target vector sequence.

For example, the computer device may calculate a source attention distribution weight by using the following formulas:

$$\hat{\alpha}_{i,j}^{enc} = ATT(\hat{x}_{i-1}, h_{i-1}^{rec}, h_j^{enc}, \hat{c}_i^{dec}), \hat{c}_i^{dec} = \sum_{j=1}^{J} \hat{\alpha}_{i,j}^{dec} \cdot h_j^{dec},$$

where ATT represents attention mechanism processing; $\hat{x}_{i-1}$ represents a word vector of an $i-1^{th}$ word in the reconstructed source text; $h_{i-1}^{rec}$ represents a hidden layer state vector corresponding to the word vector of the $i-1^{th}$ word in the reconstructed source text, namely, the hidden layer state vector outputted by the reconstruction module; $h_j^{enc}$ represents each source vector; $h_j^{dec}$ represents each target vector; $\hat{\alpha}_{i,j}^{dec}$ represents a target attention distribution weight; and • represents point multiplication of vectors. The computer device may calculate a target attention distribution weight by using the following formula:

$$\hat{\alpha}_{i,j}^{enc} = ATT(\hat{x}_{i-1}, h_{i-1}^{rec}, h_j^{enc}, \hat{c}_i^{dec}), \hat{c}_i^{dec} = \sum_{j=1}^{J} \hat{\alpha}_{i,j}^{dec} \cdot h_j^{dec},$$

where ATT represents attention mechanism processing; $\hat{x}_{i-1}$ represents a word vector of an $i-1^{th}$ word in the reconstructed source text; $h_{i-1}^{rec}$ represents a hidden layer state vector corresponding to the word vector of the $i-1^{th}$ word in the reconstructed source text, namely, the hidden layer state vector outputted by the reconstruction module; and $h_h^{dec}$ represents each target vector.

In an exemplary embodiment, the quantity of words in a word sequence of a reconstructed text is used as a standard number of times. When the computer device performs the second attention mechanism processing on the word vector of the previous word of the current word in the reconstructed source text, the hidden layer state vector corresponding to the previous word in the reconstructed source text, the source vector sequence, and the target content vector to obtain the source attention distribution weight vector at the current time corresponding to the source vector sequence; and performs the second attention mechanism processing on the word vector of the previous word of the current word in the reconstructed source text, the hidden layer state vector corresponding to the previous word in the reconstructed source text, the target vector sequence, and the source content vector to obtain the target attention distribution weight vector at the current time corresponding to the target vector sequence, it may be considered that the computer device performs crossed attention mechanism processing on the source vector sequence and the target vector sequence.

For example, the computer device may calculate a source attention distribution weight by using the following formulas:

$$\hat{\alpha}_{i,j}^{dec} = ATT(\hat{x}_{i-1}, h_{i-1}^{rec}, h_j^{dec}),$$

where ATT represents attention mechanism processing; $\hat{x}_{i-1}$ represents a word vector of an $i-1^{th}$ word in the reconstructed source text; $h_{i-1}^{rec}$ represents a hidden layer state vector corresponding to the word vector of the $i-1^{th}$ word in the reconstructed source text, namely, the hidden layer state vector outputted by the reconstruction module; $h_j^{enc}$ represents each source vector; $h_j^{dec}$ represents each target vector; $\hat{\alpha}_{i,j}^{dec}$ represents a target attention distribution weight; and • represents point multiplication of vectors. The computer device may calculate a target attention distribution weight by using the following formulas:

$$\hat{c}_i^{enc} = \sum_{j=1}^{J} \hat{\alpha}_{i,j}^{enc} \cdot h_j^{enc},$$

where ATT represents attention mechanism processing; $\hat{x}_{i-1}$ represents a word vector of an $i-1^{th}$ word in the reconstructed source text; $h_{i-1}^{rec}$ represents a hidden layer state vector corresponding to the word vector of the $i-1^{th}$ word in the reconstructed source text, namely, the hidden layer state vector outputted by the reconstruction module; $h_j^{dec}$ represents each target vectors; and • represents point multiplication of vectors.

In the foregoing exemplary embodiments, by performing independent or crossed attention mechanism processing on the source vector sequence and the target vector sequence, the common knowledge of the source and the target may be better utilized, hidden layer features of the source and the target can be better shared, and the accuracy of machine translation is improved.

Further, when the source attention distribution weight vector at the current time and the target attention distribution weight vector at the current time are respectively determined, the source content vector at the current time may be calculated according to the source attention distribution weight vector and the source vector sequence; and the target content vector at the current time may be calculated according to the target attention distribution weight vector and the target vector sequence.

In an exemplary embodiment, the computer device may calculate the source content vector at the current time by using the following formula:

$$\hat{\alpha}_{i,j}^{dec} = ATT(\hat{x}_{i-1}, h_{i-1}^{rec}, h_j^{dec}, \hat{c}_i^{enc}), \hat{c}_i^{enc} = \sum_{j=1}^{J} \hat{\alpha}_{i,j}^{enc} \cdot h_j^{enc},$$

where $h_j^{enc}$ represents each source vector; $\hat{\alpha}_{i,j}^{enc}$ represents a source attention distribution weight; and • represents point multiplication of vectors. The computer device may calculate the target content vector at the current time by using the following formula:

$$\hat{c}_i^{dec} = \sum_{j=1}^{J} \hat{\alpha}_{i,j}^{dec} \cdot h_j^{dec},$$

where $h_j^{dec}$ represents each target vector; $\hat{\alpha}_{i,j}^{dec}$ represents a target attention distribution weight; and • represents point multiplication of vectors.

Further, after calculating the source content vector at the current time and the target content vector at the current time, the computer device may perform reconstruction assessment processing on the source content vector and the target content vector, to obtain reconstruction scores corresponding to the candidate target words.

In an exemplary embodiment, the computer device may calculate a hidden layer state vector corresponding to the current word in the reconstructed source text according to the word vector of the previous word of the current word in the reconstructed source text, the hidden layer state vector corresponding to the previous word in the reconstructed source text, a source semantic vector, and a target semantic vector; calculate a reconstruction score corresponding to the current word in the reconstructed source text according to the hidden layer state vector corresponding to the current word in the reconstructed source text, the word vector of the previous word of the current word in the reconstructed source text, the source semantic vector, and the target semantic vector; and obtain the reconstruction scores corresponding to the candidate target words by performing continued multiplication on the reconstruction scores corresponding to words in the reconstructed source text.

In an exemplary embodiment, the computer device may calculate the hidden layer state vector corresponding to the current word in the reconstructed source text by using the following formula:

$$h_i^{rec} = f_r(\hat{x}_{i-1}, h_{i-1}^{rec}, \hat{c}_i^{enc}, \hat{c}_i^{dec}),$$

where $f_r(\ )$ is an activation function; $\hat{x}_{i-1}$ represents an $i-1^{th}$ word vector in the reconstructed source text; $h_i^{rec}$ represents a hidden layer state vector corresponding to the $i^{th}$ word vector in the reconstructed source text; $\hat{c}_i^{enc}$ represents a source content vector at a current time; and $\hat{c}_i^{dec}$ represents a target content vector at the current time.

In an exemplary embodiment, the computer device may calculate the reconstruction scores corresponding to the candidate target words by using the following formula:

$$R(\hat{x} \mid h^{enc}, h^{dec}) = \prod_{i=1}^{I} g_r(\hat{x}_{i-1}, h_i^{rec}, \hat{c}_i^{enc}, \hat{c}_i^{dec}),$$

where $g_r(\ )$ is a normalization function; $\hat{x}_{i-1}$ represents an i-1$^{th}$ word vector in the reconstructed source text; $h_i^{rec}$ represents a hidden layer state vector corresponding to the i$^{th}$ word in the reconstructed source text; $\hat{c}_i^{enc}$ represents a source content vector at a current time; $\hat{c}_i^{dec}$ represents a target content vector at the current time; and $\Pi(\ )$ represents continued multiplication.

Figure 6:
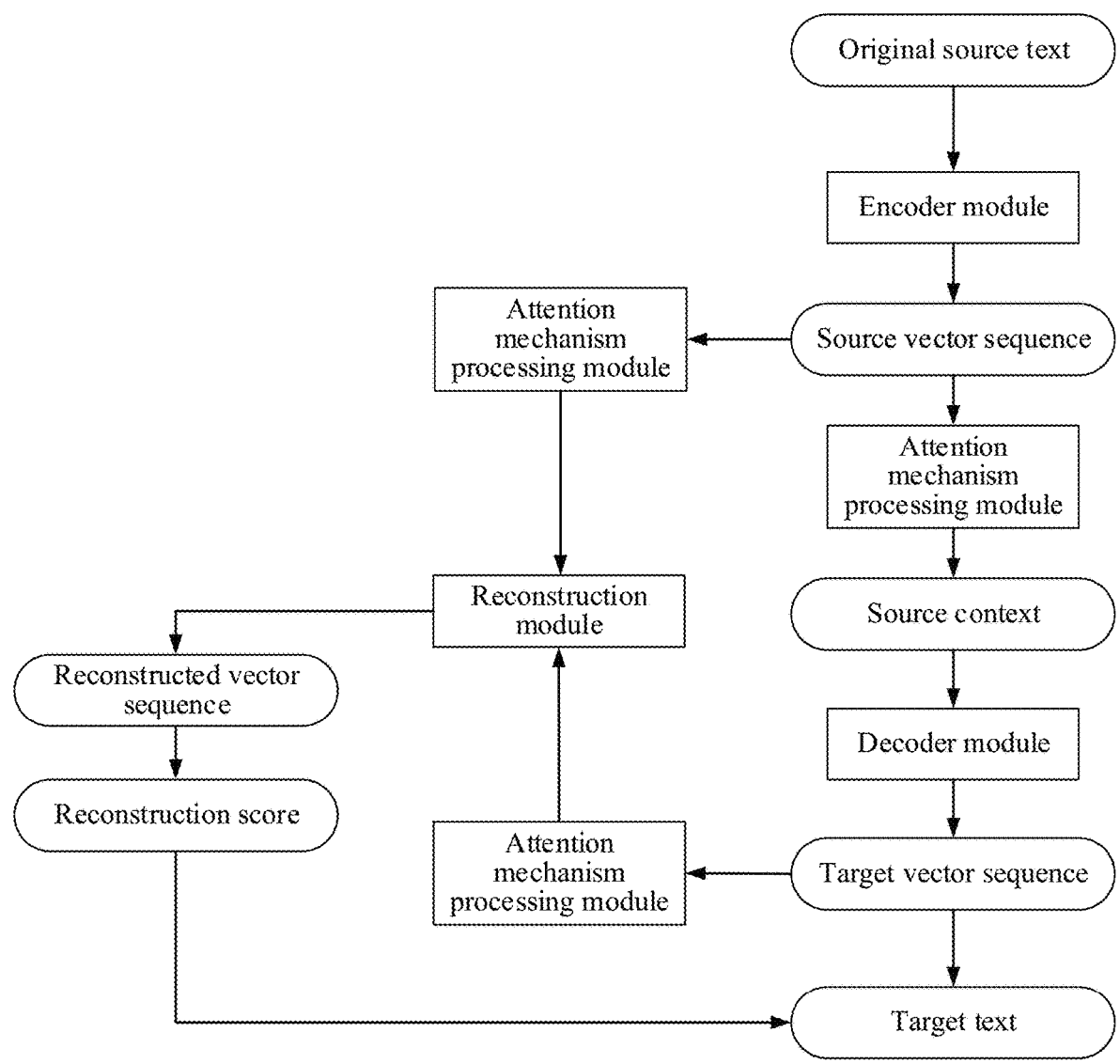
FIG. 6 is a schematic flowchart of machine translation by using a machine translation model including an encoder-decoder structure according to an exemplary embodiment.
Figure 7:
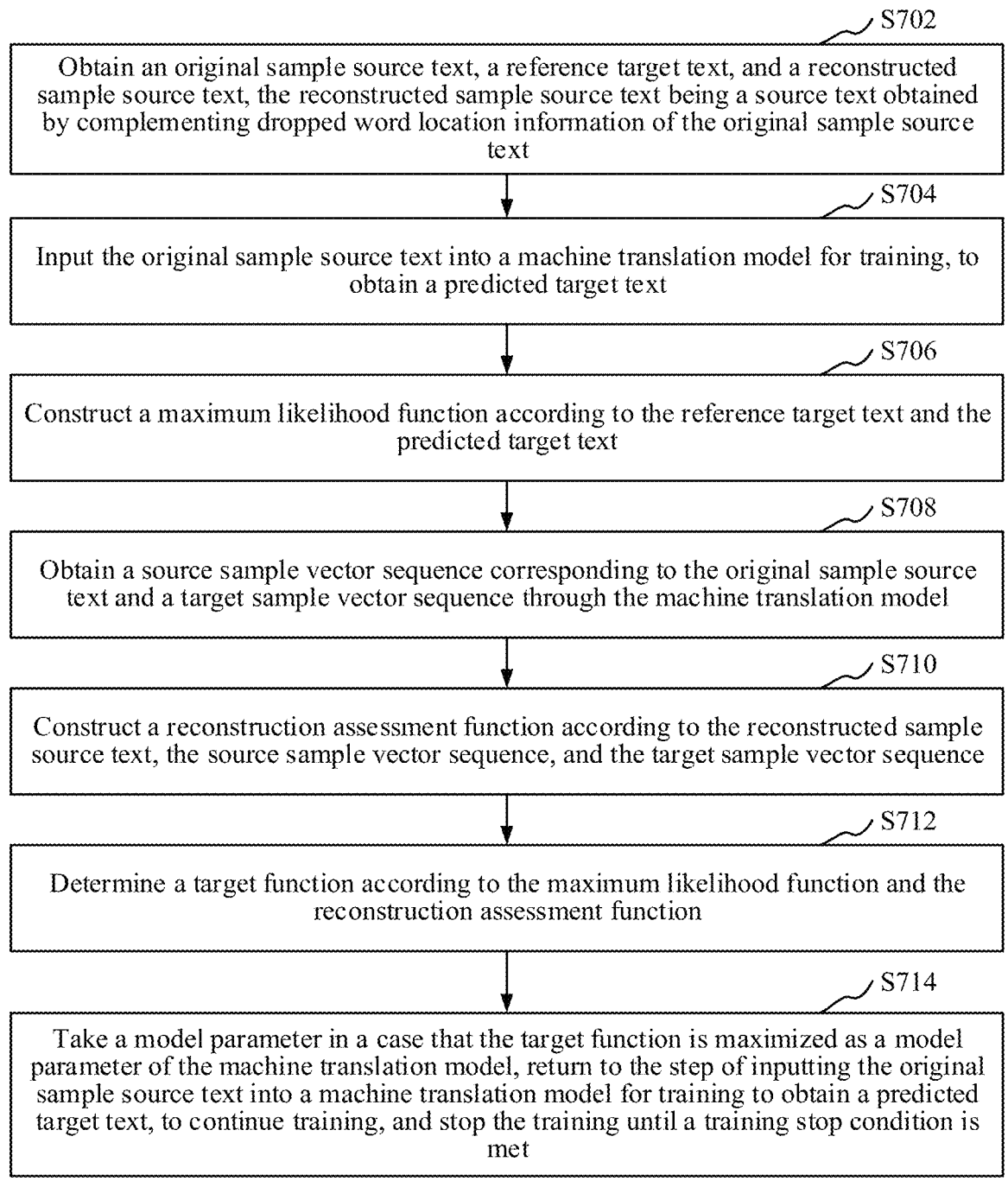
FIG. 7 is a schematic flowchart of training steps of a machine translation model according to an exemplary embodiment.

In an exemplary embodiment, FIG. 6 is a schematic flowchart of machine translation by using a machine translation model including an encoder-decoder structure according to an exemplary embodiment. An original source text (that is, an inputted sentence) is first inputted into an encoder of the machine translation model, to output a source vector sequence by using the encoder module. The source vector sequence is then inputted into an attention module, to perform attention mechanism processing on the source vector sequence by using an attention mechanism processing module, to obtain a source content vector at a current time, namely, source context at the current time. The source context at the current time is then inputted into a decoder of the machine translation model, to decode the source context at the current time by using the decoder module, to output a target vector at the current time. The foregoing steps are repeated sequentially until a target vector sequence corresponding to the original source text is obtained. The source vector sequence, the target vector sequence, and the reconstructed source text are inputted into a reconstruction module of the machine translation model, and the source vector sequence and the target vector sequence are processed by the reconstruction module, to obtain a reconstructed vector sequence. Then a reconstruction score is obtained by comparing differences between the reconstructed vector sequence and the reconstructed source text. A target text is finally generated according to the reconstruction score and the target vector sequence.

In the foregoing exemplary embodiments, attention mechanism processing is respectively performed on the source vector sequence and the target vector sequence, to obtain a corresponding source content vector and a corresponding target content vector. Reconstruction assessment processing is then performed on the source content vector and the target content vector according to the reconstructed source text, to obtain a more accurate reconstruction score integrating source information and target information. In this way, similarity relationships between the source vector sequence and the reconstructed source and between the target content vector and the reconstructed source text can be well evaluated according to the reconstruction score, to further generate an accurate target text with the assistance of the reconstruction score.

In an exemplary embodiment, the machine translation method is performed by a machine translation model, and training of the machine translation model includes the following steps:

S702: Obtain an original sample source text, a reference target text, and a reconstructed sample source text, the reconstructed sample source text being a source text obtained by supplementing dropped word location information of the original sample source text.

The original sample source text, the reference target text, and the reconstructed sample source text are training data. The reconstructed sample source text is a source text obtained by supplementing dropped word location information of the original sample source text. Specifically, the computer device may obtain a "sample source text-reconstructed sample source text-reference target text" ternary correspondence corpus from a plurality of public data sets.

In an exemplary embodiment, the computer device may predict a location of a dropped word in the original sample source text by using a pre-trained dropped word restoration model, and then add a reference character to the location of the dropped word to obtain a reconstructed sample source text.

S704: Input the original sample source text into the machine translation model for training, to obtain a predicted target text.

Specifically, the computer device may input a word sequence of the original sample source text into the machine translation model, to obtain the predicted target text by performing the machine translation method according to the machine translation model. The computer device may adjust a model parameter towards a direction of reducing differences between the predicted target text and the reference target text. In this way, word sequences of original sample source texts are continuously inputted to obtain predicted target texts, and the model parameter is adjusted according to the differences between the predicted target texts and the reference target texts, to train the machine translation model.

S706: Construct a maximum likelihood function according to the reference target text and the predicted target text.

The maximum likelihood function is used for evaluating a degree of difference between the reference target text and the predicted target text. The maximum likelihood function takes the responsibility for training a good machine translation model, to enable the model to generate a fluent target text with correct syntax.

In an exemplary embodiment, the maximum likelihood function may be constructed by using the following formula:

$$J_{likelihood}(\theta) = \mathrm{argmax}_\theta \sum_{n=1}^{N} \log P(y^n \mid x^n; \theta),$$

where arg max represents a function for finding a parameter with a maximum value, namely, a $\theta$ value for maximizing a value of log $P(y_n | x^n; \theta)$, $\{[x^n, y^n]\}_{n=1}^{N}$ is a training sample pair in model training, log is a logarithmic function, $\Sigma(\ )$ is overlay computation, and $\theta$ is a model parameter.

S708: Obtain a source sample vector sequence corresponding to the original sample source text and a target sample vector sequence through the machine translation model.

Specifically, the computer device may input the word sequence of the original source text into the machine translation model, to perform semantic encoding on the original source text by using the encoder in the machine translation model, to obtain the source vector sequence corresponding to the original source text. The source vector sequence is sequentially decoded by using the decoder of the machine translation model to obtain target vectors, decoding at each time is performed according to a word vector of a candidate target word determined at a previous time, and a candidate target word at a current time is determined according to a target vector at the current time. A target vector sequence is formed by splicing the target vectors obtained through sequential decoding.

S710: Construct a reconstruction assessment function according to the reconstructed sample source text, the source sample vector sequence, and the target sample vector sequence.

The reconstruction assessment function is used for evaluating a recall degree of dropped pronoun information, and can assist the machine translation model and a reconstruction module in better learning a hidden layer representation of the dropped word location information. Specifically, the computer device may input the source vector sequence and the target vector sequence into the reconstruction module of the machine translation model, to reconstruct, by using the reconstruction module and based on a hidden layer vector sequence of the encoder end and a hidden layer vector sequence of the decoder end, a source language sentence in which dropped word location information is automatically marked. The process is equal to an auto-encoder operation, and it is assumed that the process may allow the source vector sequence and the target vector sequence to learn the dropped pronoun location information. A reconstruction assessment function is constructed according to differences between the obtained reconstructed source text and an estimated reconstructed source text.

In an exemplary embodiment, the reconstruction assessment function may be constructed by using the following formulas:

$$J_{reconstruction}(\theta, \gamma) = \mathrm{argmax}_{\theta,\gamma} \log R(\hat{x} \mid h^{enc}, h^{dec}; \theta, \gamma);$$

$$R(\hat{x} \mid h^{enc}, h^{dec}) = \prod_{i=1}^{I} g_r(\hat{x}_{i-1}, h_i^{rec}, \hat{c}_i^{enc}, \hat{c}_i^{dec})$$

$$h_i^{rec} = f_r(\hat{x}_{i-1}, h_{i-1}^{rec}, \hat{c}_i^{enc}, \hat{c}_i^{dec});$$

$$h_i^{rec} = f_r(\hat{x}_{i-1}, h_{i-1}^{rec}, \hat{c}_i^{enc}, \hat{c}_i^{dec}); \hat{c}_i = \sum_{j=1}^{J} \hat{\alpha}_{i,j} \cdot h_j,$$

where $R(\hat{x} \mid h^{enc}, h_{dec})$ represents a reconstruction score; $\theta$ and $\gamma$ are model parameters; $g_r(\ )$ and $f_r(\ )$ are respectively a normalization function and an activation function; $\hat{x}_{i-1}$ represents a word vector of an i-1$^{th}$ word in the reconstructed source text; $h_i^{rec}$ represents a hidden layer state vector corresponding to a word vector of an i$^{th}$ word in the reconstructed source text; $h_j$ represents each source vector or target vector; $\hat{\alpha}_{i,j}$ represents a source attention distribution weight or a target attention distribution weight; and • represents point multiplication of vectors.

S712: Determine a target function according to the maximum likelihood function and the reconstruction assessment function.

Specifically, the computer device may calculate a weighted sum of the maximum likelihood function and the reconstruction assessment function, and use a weighted sum function as the target function of the machine translation model. The machine translation model may obtain the target function of each sample by using the following formula: $J=J_{likelihood}+\lambda J_{reconstruction}$, where $\lambda$ is a weighting coefficient.

In an exemplary embodiment, the target function may be represented by using the following functions:

$$J(\theta, \gamma) = \mathrm{argmax}_{\theta,\gamma} \{\log L(y \mid x; \theta) + \lambda \log R(\hat{x} \mid h^{enc}, h^{dec}; \theta, \gamma)\};$$

$$R(\hat{x} \mid h^{enc}, h^{dec}) = \prod_{i=1}^{I} g_r(\hat{x}_{i-1}, h_i^{rec}, \hat{c}_i^{enc}, \hat{c}_i^{dec})$$

$$h_i^{rec} = f_r(\hat{x}_{i-1}, h_{i-1}^{rec}, \hat{c}_i^{enc}, \hat{c}_i^{dec});$$

$$h_i^{rec} = f_r(\hat{x}_{i-1}, h_{i-1}^{rec}, \hat{c}_i^{enc}, \hat{c}_i^{dec});$$

$$\hat{c}_i = \sum_{j=1}^{J} \hat{\alpha}_{i,j} \cdot h_j$$

where $\theta$ and $\gamma$ are model parameters; [x, y] is a training sample pair in model training; $g_r(\ )$ and $f_r(\ )$ are respectively a normalization function and an activation function; $\hat{x}_{i-1}$ represents a word vector of an i-1$^{th}$ word in the reconstructed source text; $h_i^{rec}$ represents a hidden layer state vector corresponding to a word vector of an i$^{th}$ word in the reconstructed source text; $h_j$ represents each source vector or a target vector; $\hat{\alpha}_{i,j}$ represents a source attention distribution weight or a target attention distribution weight; and • represents point multiplication of vectors.

S714: Take a model parameter in a case that the target function is maximized as a model parameter of the machine translation model, return to the step of inputting the original sample source text into the machine translation model for training to obtain a predicted target text, to continue training, and stop the training until a training stop condition is met.

The training stop condition is a condition for ending model training. The training stop condition may be reaching a preset quantity of iterations, or that a performance indicator of a machine translation model with the adjusted model parameter reaches a preset indicator. Training the machine translation model is to adjust a model parameter of the machine translation model.

Specifically, for the target function corresponding to each sample sequence, a model parameter when the target function is maximized is taken as a model parameter of the machine translation model, then prediction is performed on a next sample sequence based on the model parameter, to continue to train the model parameter, and the training is stopped until the training stop condition is met.

Figure 8:
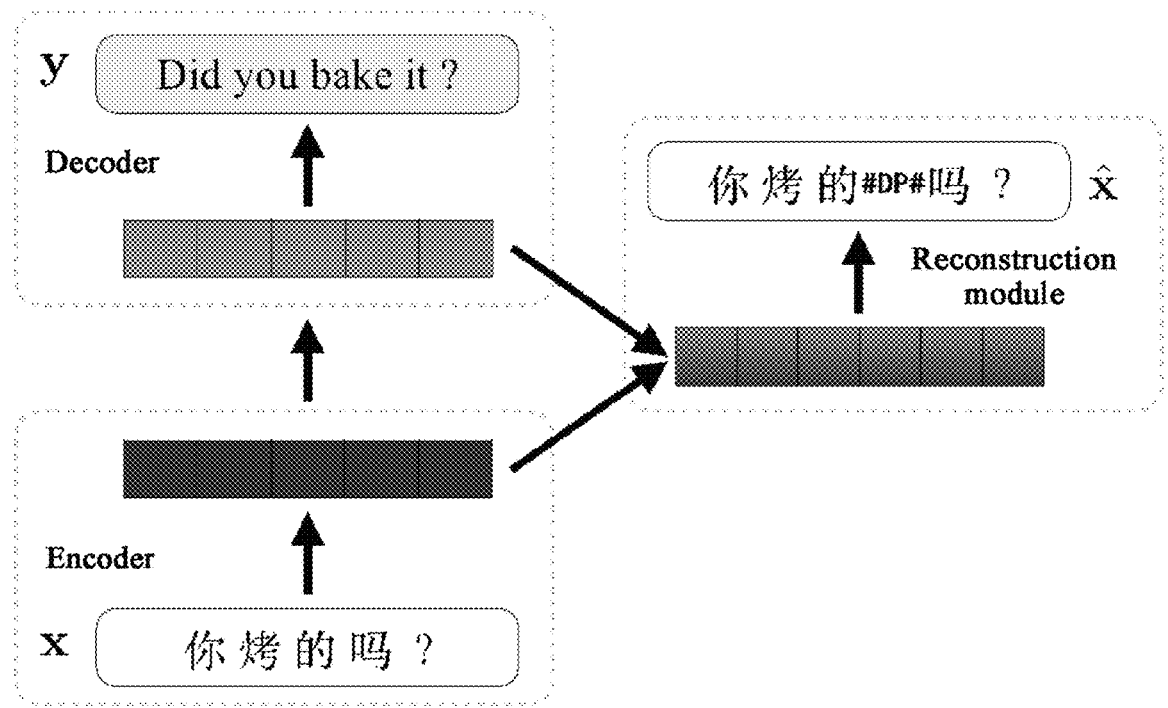
FIG. 8 is a schematic structural diagram of performing shared reconstruction processing on a source vector sequence and a target vector sequence through a machine translation trained by using a weighted sum function of a maximum likelihood function and a reconstruction assessment function as a target function.

In an exemplary embodiment, FIG. 8 is a schematic structural diagram of performing shared reconstruction processing on a source vector sequence and a target vector sequence through a machine translation trained by using a weighted sum function of a maximum likelihood function and a reconstruction assessment function as a target function. As shown in FIG. 8, a source vector sequence corresponding to a source text X "你烤的吗?" and a target vector sequence corresponding to a target text Y "Did you bake it" are inputted into a reconstruction module of the machine translation model, to reconstruct, by using the reconstruction module, a reconstructed hidden layer vector corresponding to a predicted reconstructed source text $\hat{x}$ "你烤的#DP#吗?" in which dropped word location information is added. A reconstruction score is further calculated by the reconstruction module according to the differences between the predicted reconstructed source text $\hat{x}$ and the reconstructed source text, to assist in evaluating the capability of the encoder and the decoder for restoring dropped pronouns.

An additional shared reconstruction layer (that is, the reconstruction module) is introduced into the machine translation model. An input of the shared reconstruction layer is hidden layer state vectors of the encoder end and the decoder end and a source sentence in which dropped word location information is automatically marked, and an output of the shared reconstruction layer is a shared reconstruction score. During training, the reconstruction score and a maximum likelihood estimation are linearly overlaid to be optimized, to enable the source vector sequence and the target vector sequence learn location information of dropped pronouns in a sharing manner.

In the foregoing exemplary embodiments, in a process of model training, an objective of the training is not only to consider the maximum likelihood, but also to consider the capability of summarizing implicit pronouns shared by the source vector sequence and the target vector sequence. The overall translation quality may be uniformly enhanced by merging two learning objectives, and the parameter is effectively guided to adjust towards a direction of restoring the dropped words, so that the machine translation model obtained through training has higher translation accuracy.

In an exemplary embodiment, the training steps of the machine translation model further include: obtaining a sample dropped word sequence corresponding to the original sample source text; performing dropped word reconstruction processing on the source sample vector sequence and the target sample vector sequence by using a reconstruction module of the machine translation model, to obtain a hidden layer state vector sequence corresponding to the sample dropped word sequence; and constructing a dropped word restoration function according to the sample dropped word sequence and the hidden layer state vector sequence. Step S712, namely, the step of determining a target function according to the maximum likelihood function and the reconstruction assessment function specifically includes: determining the target function according to the maximum likelihood function, the reconstruction assessment function, and the dropped word restoration function.

The sample dropped word sequence corresponding to the original sample source text is a sequence formed by dropped words in the original sample source text. The dropped word restoration function is used for evaluating a restoration degree of dropped pronouns, and can assist the machine translation model and the reconstruction module in better predicting word information of the dropped words.

In an exemplary embodiment, the computer device may perform word alignment processing on the original sample source text and the reference target text, to restore dropped words in the original sample source text according to the reference target text. Alternatively, the computer device may manually restore the dropped words in the original sample source text according to a language environment of the original sample source text. The computer device may splice the dropped words in the original source text sequentially into a sample dropped word sequence.

Further, the computer device may input the source sample vector sequence and the target sample vector sequence into the reconstruction module of the machine translation model, to perform dropped word reconstruction processing, to obtain a hidden layer state vector sequence corresponding to the sample dropped word sequence. The reconstruction module may construct a reconstruction assessment function according to differences between the reconstructed sample source text and the estimated reconstructed source text, and perform classification processing on a dropped word at a specified location according to the estimated reconstructed source text, to predict the dropped word to be restored at the specified location. The computer device constructs the dropped word restoration function according to the sample dropped word sequence and the hidden layer state vector sequence.

In an exemplary embodiment, the computer device constructs the dropped word restoration function by using the following formulas:

$$J_{prediction}(\theta, \gamma, \psi) = \mathrm{argmax}_{\theta,\gamma,\psi} \log P(dp | \hat{h}^{rec}; \theta, \gamma, \psi),$$

$$P(dp | \hat{h}^{rec}) = \prod_{d=1}^{D} P(dp_d | \hat{h}_d^{rec}) = \prod_{d=1}^{D} g_P(dp_d | \hat{h}_d^{rec})$$

where $\theta$, $\gamma$, and $\tau$ are model parameters; $dp=\{dp_1, dp_2, \ldots, dp_D\}$ is the sample dropped word sequence; $\hat{h}^{rec}=\{\hat{h}_1^{rec}, \hat{h}_2^{rec}, \ldots, \hat{h}_D^{rec}\}$ is the hidden layer state vector sequence that is outputted by the reconstruction module and corresponds to the sample dropped word sequence; and $g_p( )$ is a normalization function.

Further, the computer device may use a weighted sum function of the maximum likelihood function, the reconstruction assessment function, and the dropped word restoration function as the target function of the machine translation model. Specifically, the computer device may calculate a weighted sum of the maximum likelihood function, the reconstruction assessment function, and the dropped word restoration function, and use a weighted sum function as the target function of the machine translation model.

In an exemplary embodiment, the computer device may obtain the target function of each sample by using the following formula:

$$J=J_{likelihood}+\lambda J_{reconstruction}+\tau J_{prediction},$$

where $\lambda$ and $\tau$ are weighting coefficients. Specifically, the computer device may represent the target function by using the following formulas:

$$J(\theta, \gamma, \psi) = \mathrm{argmax}_{\theta,\gamma,\psi}$$

$$\{\log L(y|x;\theta) + \lambda \log R(\hat{x}|h^{enc}, h^{dec}; \theta, \gamma) + \tau \log P(dp|\hat{h}^{rec}; \theta, \gamma, \psi)\};$$

$$P(dp|\hat{h}^{rec}) = \prod_{d=1}^{D} P(dp_d | \hat{h}_d^{rec}) = \prod_{d=1}^{D} g_P(dp_d | \hat{h}_d^{rec}),$$

where $dp=\{dp_1, dp_2, \ldots, dp_D\}$ is the sample dropped word sequence; $\hat{h}^{rec}=\{\hat{h}_1^{rec}, \hat{h}_2^{rec}, \ldots, \hat{h}_D^{rec}\}$ is the hidden layer state vector sequence corresponding to the sample dropped word sequence; and $g_p( )$ is a normalization function.

Further, in a process of training the machine translation model, the computer device may take, for the target function corresponding to each sample sequence, a model parameter in a case that the target function is maximized as a model parameter of the machine translation model, then perform prediction on a next sample sequence based on the model parameter, to continue to train the model parameter, and stop the training until the training stop condition is met.

Figure 9:
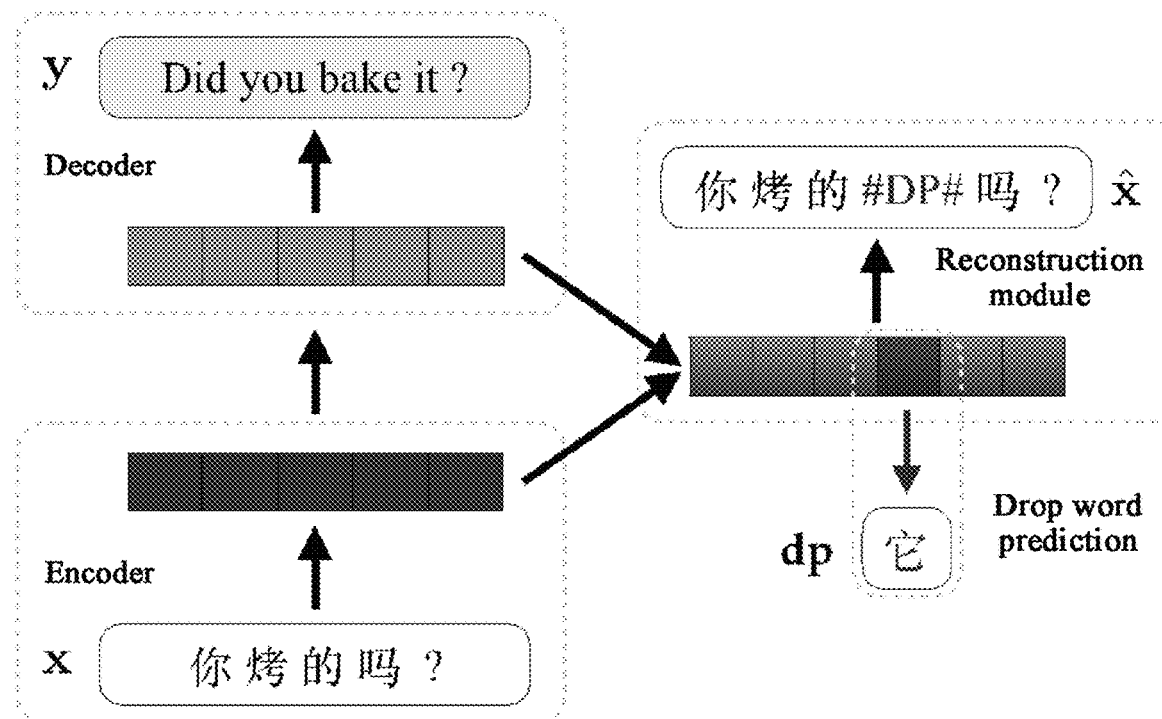
FIG. 9 is a schematic structural diagram of performing shared reconstruction processing on a source vector sequence and a target vector sequence through a machine translation model trained by using a weighted sum function of a maximum likelihood function, a reconstruction assessment function, and a dropped word restoration function as a target function.

In an exemplary embodiment, FIG. 9 is a schematic structural diagram of performing shared reconstruction processing on a source vector sequence and a target vector sequence through a machine translation model trained by using a weighted sum function of a maximum likelihood function, a reconstruction assessment function, and a dropped word restoration function as a target function. As shown in FIG. 9, a source vector sequence corresponding to a source text X "你烤的吗?" and a target vector sequence corresponding to a target text y are inputted into a reconstruction module of the machine translation model, to reconstruct, by using the reconstruction module, a reconstructed hidden layer vector corresponding to a predicted reconstructed source text x̂ "你烤的 #DP # 吗?" in which dropped word location information is added, and a dropped word "它" is predicted according to the reconstructed hidden layer state vector.

Figure 10:
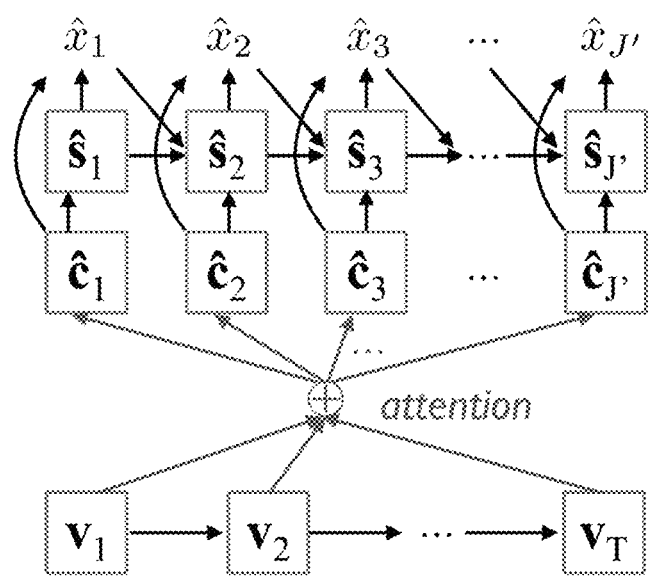
FIG. 10 is a schematic structural diagram of reconstructing, by using a source vector sequence and a target vector sequence, a text including dropped pronouns through a reconstruction module.

FIG. 10 is a schematic structural diagram of reconstructing, by using a source vector sequence and a target vector sequence, texts including dropped pronouns through a reconstruction module. As shown in FIG. 10, the source vector sequence may be represented by $\{v_1, V_2, \ldots, V_T\}$. For the decoder, a content vector sequence obtained at each moment by performing attention mechanism processing on the source vector sequence is denoted by $\{ĉ_1, ĉ_2, \ldots, ĉ_{J'}\}$; accordingly, the target vector sequence decoded at each moment by the decoder according to the content vector is denoted by $\{ŝ_1, ŝ_2, \ldots, ŝ_{J'}\}$; and the reconstruction module reconstructs, according to the content vector sequence and the target vector sequence, a source text $\{x̂_1, x̂_2, \ldots, x̂_{J'}\}$ in which dropped words are supplemented.

Further, the computer device may adjust the model parameter to train the machine translation model according to the predicted target text, the predicted reconstructed source text, and differences between the predicted dropped words and the samples. An idea of associative learning is introduced into the machine translation model obtained through training by using the weighted sum function of the maximum likelihood function, the reconstruction assessment function, and the dropped word restoration function as the target function of the machine translation model. On the one hand, the reconstruction module may share the source hidden layer state vectors and the target hidden layer state vectors, to reconstruct a source sentence in which dropped word location information is marked; and on the other hand, the reconstruction module is used to predict word surface information of the dropped word. During training, the reconstruction score, the machine translation estimation, and dropped word restoration loss are linearly overlaid to be optimized, so that the machine translation model may not only learn the location information of the dropped word, but also have a capability of restoring a word surface of the dropped word. In a process of using the machine translation model obtained by training according to the foregoing method, an input of the reconstruction module is a hidden layer state vector sequence and a sentence including dropped pronouns, and an output of the reconstruction module is a reconstruction score used for evaluating a recall degree of dropped pronoun information.

In an exemplary embodiment, according to various exemplary embodiments implemented according to the machine translation model provided in this application, the hidden layer state vector information of the encoder end and the decoder end is shared, and a word surface restoration task and a translation task of the dropped pronouns may be modeled uniformly Such a machine translation method, which integrates dropped pronoun restoration based on a shared reconstruction mechanism and associative learning of neural network machine translation, further enhances attention to dropped pronouns and the dropped pronoun learning capability of the machine translation model, so that the translation quality is further improved.

The method provided in this application may be applied in any mainstream neural network machine translation system, such as an RNN model or a transformer framework system, and is suitable for all translation tasks from a pro-drop language to a non-pro-drop language (for example, Japanese to English, or Arabic to English). In addition, according to various exemplary embodiments of this application, the translation quality is significantly improved in machine translation.

In the foregoing exemplary embodiments, in a process of model training, an objective of the training is not only to consider the maximum likelihood and the reconstruction score, but also to consider the dropped word restoration loss. The reconstruction score, the maximum likelihood estimation, and the dropped word restoration loss are linearly overlaid to be optimized, so that the machine translation model may not only learn the location information of the dropped word, but also have the restoration capability of restoring the word surface of the dropped word. Therefore, the machine translation model obtained through training has higher translation accuracy.

Figure 11:
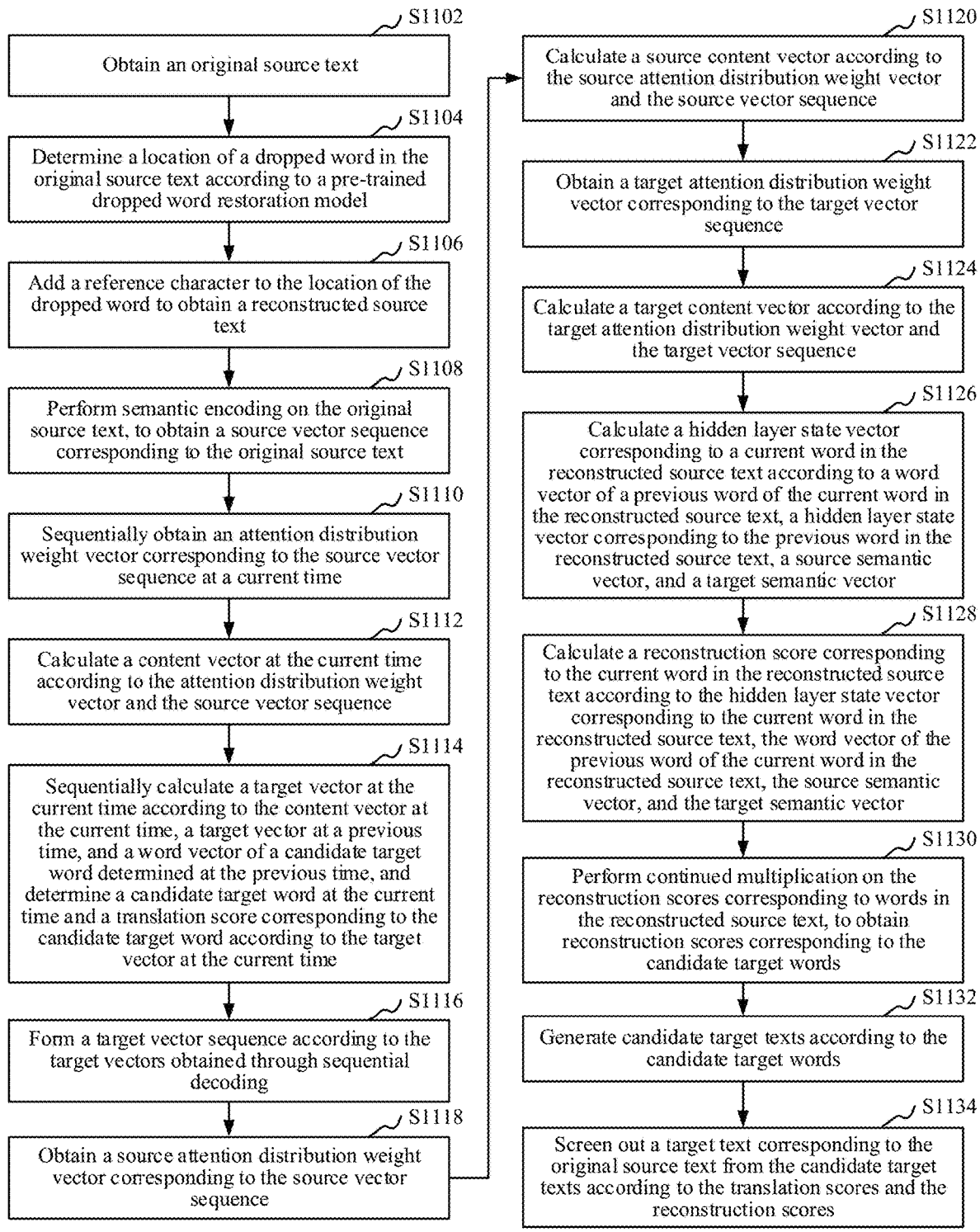
FIG. 11 is a schematic flowchart of a machine translation method according to another exemplary embodiment.

As shown in FIG. 11, in a specific exemplary embodiment, a machine translation method includes the following steps:

S1102: Obtain an original source text.

S1104: Determine a location of a dropped word in the original source text according to a pre-trained dropped word restoration model.

S1106: Add a reference character to the location of the dropped word to obtain a reconstructed source text.

S1108: Perform semantic encoding on the original source text, to obtain a source vector sequence corresponding to the original source text.

S1110: Sequentially obtain an attention distribution weight vector corresponding to the source vector sequence at a current time.

S1112: Calculate a content vector at the current time according to the attention distribution weight vector and the source vector sequence.

S1114: Sequentially calculate a target vector at the current time according to the content vector at the current time, a target vector at a previous time, and a word vector of a candidate target word determined at the previous time, and determine a candidate target word at the current time and a translation score corresponding to the candidate target word according to the target vector at the current time.

S1116: Form a target vector sequence according to the target vectors obtained through sequential decoding.

S1118: Obtain a source attention distribution weight vector corresponding to the source vector sequence.

S1120: Calculate a source content vector according to the source attention distribution weight vector and the source vector sequence.

S1122: Obtain a target attention distribution weight vector corresponding to the target vector sequence.

S1124: Calculate a target content vector according to the target attention distribution weight vector and the target vector sequence.

S1126: Calculate a hidden layer state vector corresponding to a current word in the reconstructed source text according to a word vector of a previous word of the current word in the reconstructed source text, a hidden layer state vector corresponding to the previous word in the reconstructed source text, a source semantic vector, and a target semantic vector.

S1128: Calculate a reconstruction score corresponding to the current word in the reconstructed source text according to the hidden layer state vector corresponding to the current word in the reconstructed source text, the word vector of the previous word of the current word in the reconstructed source text, the source semantic vector, and the target semantic vector.

S1130: Perform continued multiplication on the reconstruction scores corresponding to words in the reconstructed source text, to obtain the reconstruction scores corresponding to the candidate target words.

S1132: Generate candidate target texts according to the candidate target words.

S1134: Screen out a target text corresponding to the original source text from the candidate target texts according to the translation scores and the reconstruction scores.

According to the foregoing machine translation method, semantic encoding is performed on an original source text to obtain a source vector sequence corresponding to the original source text, the source vector sequence is then sequentially decoded to obtain target vectors, decoding at each time is performed according to a word vector of a candidate target word determined at a previous time, and a candidate target word at a current time is determined according to a target vector at the current time. In this way, a candidate target word generated through decoding not only includes semantic information of the source text, but also integrates semantic information of a candidate target word at a previous time, so that a finally generated target text is more coherent, and a translation result is more accurate. A target vector sequence is formed by the target vectors obtained through sequential decoding, and reconstruction assessment processing is performed on the source vector sequence and the target vector sequence according to the reconstructed source text obtained by supplementing the dropped word location information of the original source text, to obtain reconstruction scores corresponding to the candidate target words, and then a target text is generated according to the reconstruction scores and the candidate target words. In this way, by combining source hidden layer vector features and target hidden layer vector features, common information of the two ends may be shared, redundant information during reconstruction assessment processing may be reduced, and the loss of important information may be avoided, so that a recall degree of dropped word information can be well measured through the reconstruction score. In this way, because the target text is generated according to the reconstruction scores and the candidate target words, influence caused by omission of pronouns during translation may be reduced, and the translation quality is greatly improved.

FIG. 11 is a schematic flowchart of a machine translation method according to an exemplary embodiment. It is to be understood that although the steps in the flowchart of FIG. 11 are sequentially displayed in accordance with instructions of arrows, these steps are not necessarily performed sequentially in the order indicated by the arrows. Unless explicitly specified in this application, the sequence of the steps is not strictly limited, and the steps may be performed in other sequences. Furthermore, at least some steps in FIG. 11 may include a plurality of sub-steps or a plurality of stages. The sub-steps or stages are not necessarily performed at the same moment, and may be performed at different moments. The sub-steps or stages are not necessarily performed in order, and may be performed in turn or alternately with other steps or at least some of sub-steps or stages of the other steps.

Figure 12:
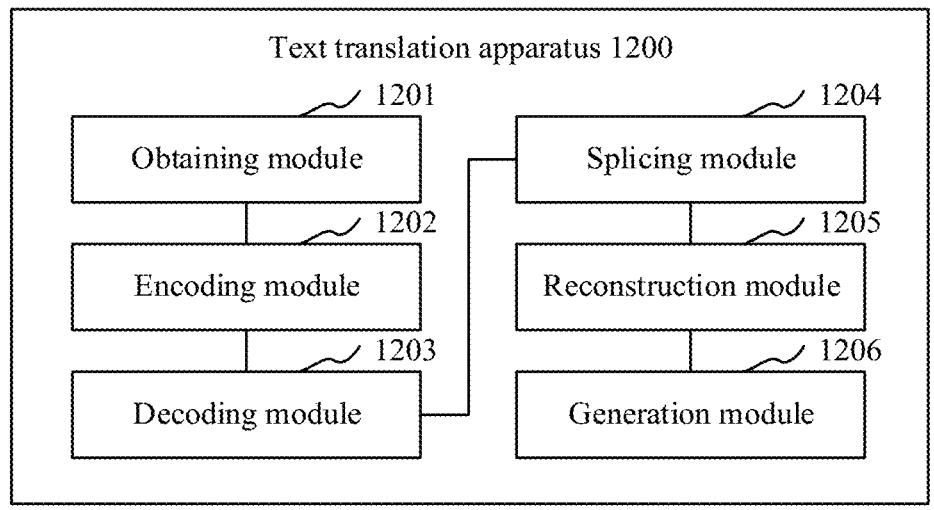
FIG. 12 is a structural block diagram of a machine translation apparatus according to an exemplary embodiment.

As shown in FIG. 12, in an exemplary embodiment, a machine translation apparatus 1200 is provided, including an obtaining module 1201, an encoding module 1202, a decoding module 1203, a splicing module 1204, a reconstruction module 1205, and a generation module 1206.

The obtaining module 1201 is configured to obtain an original source text and a reconstructed source text, the reconstructed source text being a source text obtained by supplementing dropped word location information of the original source text.

The encoding module 1202 is configured to perform semantic encoding on the original source text, to obtain a source vector sequence corresponding to the original source text.

The decoding module 1203 is configured to sequentially decode the source vector sequence to obtain target vectors, perform decoding at each time according to a word vector of a candidate target word determined at a previous time, and determine a candidate target word at a current time according to a target vector at the current time.

The splicing module 1204 is configured to form a target vector sequence according to the target vectors obtained through sequential decoding.

The reconstruction module 1205 is configured to perform reconstruction assessment processing on the source vector sequence and the target vector sequence according to the reconstructed source text, to obtain reconstruction scores corresponding to the candidate target words.

The generation module 1206 is configured to generate a target text according to the reconstruction scores and the candidate target words.

In an exemplary embodiment, the obtaining module 1201 is further configured to obtain the original source text; determine a location of a dropped word in the original source text through a pre-trained dropped word restoration model; and add a reference character to the location of the dropped word to obtain the reconstructed source text.

In an exemplary embodiment, the decoding module 1203 is further configured to sequentially obtain an attention distribution weight vector corresponding to the source vector sequence at the current time; calculate a content vector at the current time according to the attention distribution weight vector and the source vector sequence; and sequentially calculate the target vector at the current time according to the content vector at the current time, a target vector at the previous time, and the word vector of the candidate target word determined at the previous time, and determine the candidate target word at the current time according to the target vector at the current time.

In an exemplary embodiment, the machine translation apparatus 1200 further includes an attention mechanism processing module 1207, and the attention mechanism processing module 1207 is configured to obtain a source attention distribution weight vector corresponding to the source vector sequence; calculate a source content vector according to the source attention distribution weight vector and the source vector sequence; obtain a target attention distribution weight vector corresponding to the target vector sequence; and calculate a target content vector according to the target attention distribution weight vector and the target vector sequence. The reconstruction module 1205 is further configured to perform reconstruction assessment processing on the source content vector and the target content vector according to the reconstructed source text, to obtain the reconstruction scores corresponding to the candidate target words.

In an exemplary embodiment, the reconstruction module 1205 is further configured to calculate a hidden layer state vector corresponding to the current word in the reconstructed source text according to the word vector of the previous word of the current word in the reconstructed source text, the hidden layer state vector corresponding to the previous word in the reconstructed source text, a source semantic vector, and a target semantic vector; calculate a reconstruction score corresponding to the current word in the reconstructed source text according to the hidden layer state vector corresponding to the current word in the reconstructed source text, the word vector of the previous word of the current word in the reconstructed source text, the source semantic vector, and the target semantic vector; and obtain the reconstruction scores corresponding to the candidate target words by performing continued multiplication on the reconstruction scores corresponding to words in the reconstructed source text.

In an exemplary embodiment, the attention mechanism processing module 1207 is further configured to perform first attention mechanism processing on a word vector of a previous word of a current word in the reconstructed source text, a hidden layer state vector outputted by the reconstruction module and corresponding to the previous word in the reconstructed source text, and the source vector sequence, to obtain the source attention distribution weight vector corresponding to the source vector sequence; or perform second attention mechanism processing on a word vector of a previous word of a current word in the reconstructed source text, a hidden layer state vector outputted by the reconstruction module and corresponding to the previous word in the reconstructed source text, the source vector sequence, and the target content vector, to obtain the source attention distribution weight vector corresponding to the source vector sequence.

In an exemplary embodiment, the attention mechanism processing module 1207 is further configured to perform first attention mechanism processing on a word vector of a previous word of a current word in the reconstructed source text, a hidden layer state vector outputted by the reconstruction module and corresponding to the previous word in the reconstructed source text, and the target vector sequence, to obtain the target attention distribution weight vector corresponding to the target vector sequence; or perform second attention mechanism processing on a word vector of a previous word of a current word in the reconstructed source text, a hidden layer state vector outputted by the reconstruction module and corresponding to the previous word in the reconstructed source text, the target vector sequence, and the source content vector, to obtain the target attention distribution weight vector corresponding to the target vector sequence.

In an exemplary embodiment, the decoding module 1203 is further configured to determine the candidate target word at the current time and a translation score corresponding to the candidate target word according to the target vector at the current time. The generation module 1206 is further configured to generate candidate target texts according to the candidate target words; and screen out the target text corresponding to the original source text from the candidate target texts according to the translation scores and the reconstruction scores.

Figure 13:
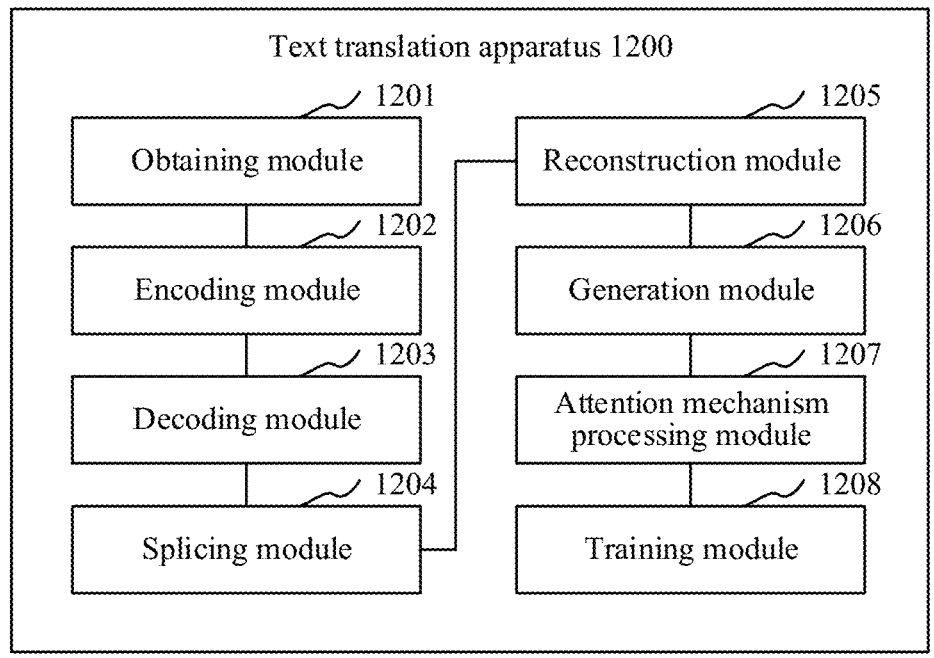
FIG. 13 is a structural block diagram of a machine translation apparatus according to another exemplary embodiment.

In an exemplary embodiment, referring to FIG. 13, the machine translation apparatus further includes a training module 1208, and the training module 1208 is configured to obtain an original sample source text, a reference target text, and a reconstructed sample source text, the reconstructed sample source text being a source text obtained by supplementing dropped word location information of the original sample source text; input the original sample source text into a machine translation model for training, to obtain a predicted target text; construct a maximum likelihood function according to the reference target text and the predicted target text; obtain a source sample vector sequence and a target sample vector sequence corresponding to the original sample source text by using the machine translation model; construct a reconstruction assessment function according to the reconstructed sample source text, the source sample vector sequence, and the target sample vector sequence; determine a target function according to the maximum likelihood function and the reconstruction assessment function; take a model parameter in a case that the target function is maximized as a model parameter of the machine translation model, return to the step of inputting the original sample source text into a machine translation model for training to obtain a predicted target text, to continue training, and stop the training until a training stop condition is met.

In an exemplary embodiment, the training module 1208 is further configured to use a weighted sum function of the maximum likelihood function and the reconstruction assessment function as a target function of the machine translation model, where the target function is represented by using the following formulas:

$$J(\theta, \gamma) = \mathrm{argmax}_{\theta,\gamma}\{\log L(y \mid x; \theta) + \lambda \log R(\hat{x} \mid h^{enc}, h^{dec}; \theta, \gamma)\};$$

$$R(\hat{x} \mid h^{enc}, h^{dec}) = \prod_{i=1}^{I} g_r(\hat{x}_{i-1}, h_i^{rec}, \hat{c}_i^{enc}, \hat{c}_i^{dec})$$

$$h_i^{rec} = f_r(\hat{x}_{i-1}, h_{i-1}^{rec}, \hat{c}_i^{enc}, \hat{c}_i^{dec});$$

$$h_i^{rec} = f_r(\hat{x}_{i-1}, h_{i-1}^{rec}, \hat{c}_i^{enc}, \hat{c}_i^{dec});$$

$$\hat{c}_i = \sum_{j=1}^{J} \hat{\alpha}_{i,j} \cdot h_j$$

where $\theta$ and $\gamma$ are model parameters; $[x, y]$ is a training sample pair in model training; $g_r(\ )$ and $f_r(\ )$ are respectively a normalization function and an activation function; $\hat{x}_{i-1}$ represents a word vector of an i-1$^{th}$ word in the reconstructed source text; $h_i^{rec}$ represents a hidden layer state vector corresponding to a word vector of an i$^{th}$ word in the reconstructed source text; $h_j$ represents each source vector or target vector; $\hat{\alpha}_{i,j}$ represents a source attention distribution weight or a target attention distribution weight; and • represents point multiplication of vectors.

In an exemplary embodiment, the training module 1208 is further configured to: obtain a sample dropped word sequence corresponding to the original sample source text; perform dropped word reconstruction processing on the source sample vector sequence and the target sample vector sequence by using a reconstruction module of the machine translation model, to obtain a hidden layer state vector sequence corresponding to the sample dropped word sequence; construct a dropped word restoration function according to the sample dropped word sequence and the hidden layer state vector sequence; and determine the target function according to the maximum likelihood function, the reconstruction assessment function, and the dropped word restoration function.

In an exemplary embodiment, the training module 1208 is further configured to use a weighted sum function of the maximum likelihood function, the reconstruction assessment function, and the dropped word restoration function as a target function of the machine translation model, where the target function is represented by using the following formulas:

$$J(\theta, \gamma, \psi) = \operatorname{argmax}_{\theta,\gamma,\psi} \{\log L(y \mid x; \theta) + \lambda \log R(\hat{x} \mid h^{enc}, h^{dec}; \theta, \gamma) + \tau \log P(dp \mid \hat{h}^{rec}; \theta, \gamma, \psi)\};$$

$$P(dp \mid \hat{h}^{rec}) = \prod_{d=1}^{D} P(dp_d \mid \hat{h}_d^{rec}) = \prod_{d=1}^{D} g_P(dp_d \mid \hat{h}_d^{rec}),$$

where $\theta$, $\gamma$, and $\tau$ are model parameters; $dp=\{dp_1, dp_2, \ldots, dp_D\}$ is the sample dropped word sequence; $\hat{h}^{rec}=\{\hat{h}_1^{rec}, \hat{h}_2^{rec}, \ldots, \hat{h}_D^{rec}\}$ is the hidden layer state vector sequence corresponding to the sample dropped word sequence; and $g_p(\ )$ is a normalization function.

According to the foregoing machine translation apparatus, semantic encoding is performed on an original source text to obtain a source vector sequence corresponding to the original source text, the source vector sequence is then sequentially decoded to obtain target vectors, decoding at each time is performed according to a word vector of a candidate target word determined at a previous time, and a candidate target word at a current time is determined according to a target vector at the current time. In this way, a candidate target word generated through decoding not only includes semantic information of the source text, but also integrates semantic information of a candidate target word at a previous time, so that a finally generated target text is more coherent, and a translation result is more accurate. A target vector sequence is formed by the target vectors obtained through sequential decoding, and reconstruction assessment processing is performed on the source vector sequence and the target vector sequence according to the reconstructed source text obtained by supplementing the dropped word location information of the original source text, to obtain reconstruction scores corresponding to the candidate target words, and then a target text is generated according to the reconstruction scores and the candidate target words. In this way, by combining source hidden layer vector features and target hidden layer vector features, common information of the two ends may be shared, redundant information during reconstruction assessment processing may be reduced, and the loss of important information may be avoided, so that a recall degree of dropped word information can be well measured through the reconstruction score. In this way, because the target text is generated according to the reconstruction scores and the candidate target words, influence caused by omission of pronouns during translation may be reduced, and the translation quality is greatly improved.

Figure 14:
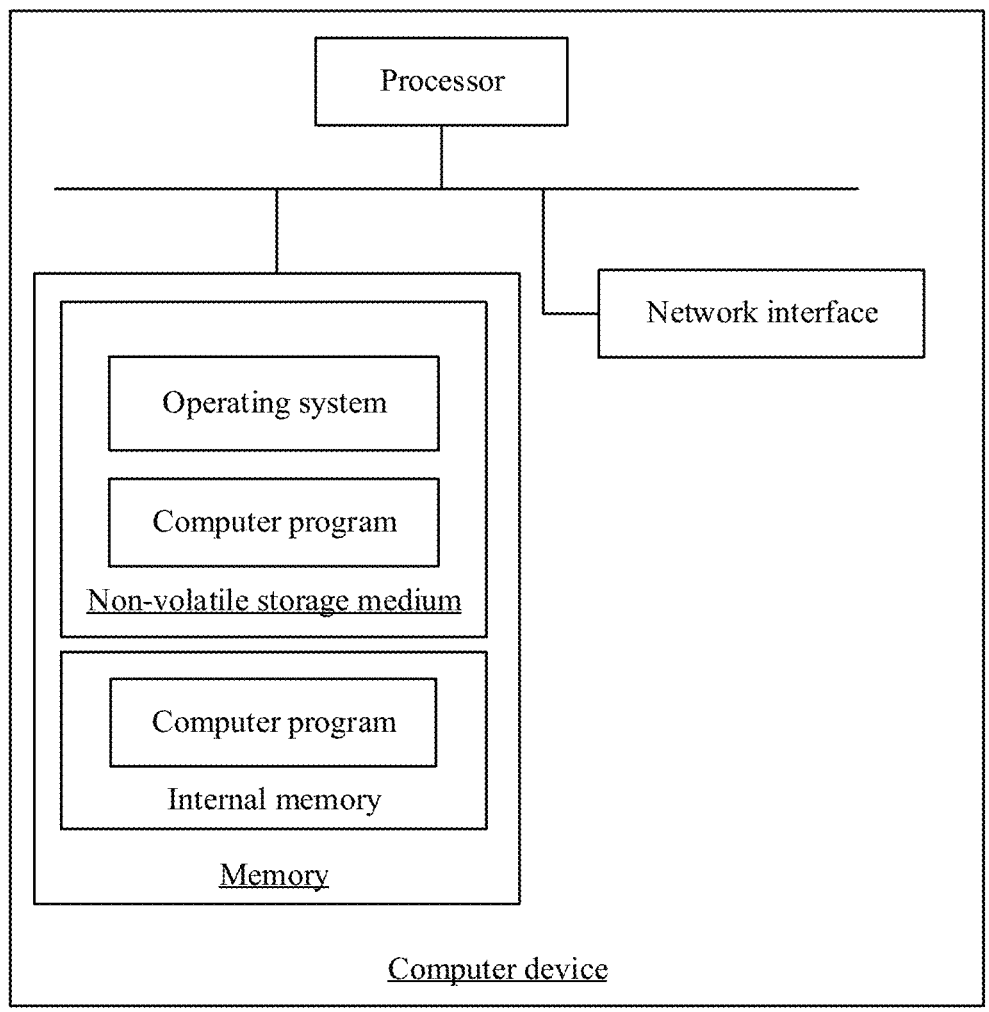
FIG. 14 is a structural block diagram of a computer device according to an exemplary embodiment.

FIG. 14 is a diagram of an internal structure of a computer device in an exemplary embodiment. The computer device may be specifically the terminal 110 or the server 120 in FIG. 1. As shown in FIG. 14, the computer device includes a processor, a memory, and a network interface connected by using a system bus. The memory includes a non-volatile storage medium and an internal memory. The non-volatile storage medium of the computer device stores an operating system and may further store a computer program. The computer program, when executed by the processor, may cause the processor to implement the machine translation method. The internal memory may also store a computer program. The computer program, when executed by the processor, may cause the processor to perform the machine translation method.

A person skilled in the art may understand that the structure shown in FIG. 14 is only a block diagram of a partial structure related to the solution of this application, and does not limit the computer device to which the solution of this application is applied. Specifically, the computer device may include more or fewer components than those shown in the figure, or some components may be combined, or a different component deployment may be used.

In an exemplary embodiment, the machine translation apparatus provided in this application may be implemented in the form of a computer program, and the computer program may be run on the computer device shown in FIG. 14. A memory of the computer device may store program modules forming the machine translation apparatus, for example, the obtaining module, the encoding module, the decoding module, the splicing module, the reconstruction module, and the generation module shown in FIG. 12. The computer program formed by the program modules causes the processor to perform the steps in the machine translation method in the exemplary embodiments of this application described in this specification.

For example, the computer device shown in FIG. 14 may perform step S202 by using the obtaining module in the machine translation apparatus shown in FIG. 12. The computer device may perform step S204 by using the encoding module. The computer device may perform step S206 by using the decoding module. The computer device may perform step S208 through the splicing module. The computer device may perform step S210 by using the reconstruction module. The computer device may perform step S212 by using the generation module.

In an exemplary embodiment, a computer device is provided, including a processor and a memory. The memory stores a computer program, the computer program, when executed by the processor, causing the processor to perform the steps of the foregoing machine translation method. Herein, the steps of the machine translation method may be the steps of the machine translation method in the foregoing exemplary embodiments.

In an exemplary embodiment, a computer-readable storage medium is provided, storing a computer program, the computer program, when executed by a processor, causing the processor to perform the steps of the foregoing machine translation method. Herein, the steps of the machine translation method may be the steps of the machine translation method in the foregoing embodiments.

A person of ordinary skill in the art may understand that all or some of the processes in the method of the foregoing embodiments may be implemented by a computer program instructing related hardware. The program may be stored in a non-volatile computer-readable storage medium, and the program, when executed, may include the processes of the foregoing method embodiments. Any reference to a memory, storage, database, or another medium used in the embodiments provided in this application may include a non-volatile and/or volatile memory. The non-volatile memory may include a ROM (read only memory), a PROM (programmable ROM), an EPROM (electrically programmable ROM), an EEPROM (electrically erasable programmable ROM) or a flash memory. The volatile memory may include a random access memory (RAM) or an external cache. As an illustration instead of a limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

The language "machine translation" may also be referred to as "text translation." The term "current time" may also be referred to as "first time" (e.g., 00:10 seconds, 3:45 pm) and the term "previous time" may also be referred to as "second time" (e.g., 00:05 seconds, 3:40 pm) that is earlier than the first time.

The technical features in the foregoing embodiments may be randomly combined. For concise description, not all possible combinations of the technical features in the embodiment are described. However, the combinations of the technical features are all to be considered as falling within the scope described in this specification provided that they do not conflict with each other.

The foregoing embodiments only show several implementations of this application, and descriptions thereof are in detail, but are not to be understood as a limitation to the patent scope of this application. A person of ordinary skill in the art may further make several variations and improvements without departing from the ideas of this application, and such variations and improvements fall within the protection scope of this application. Therefore, the protection scope of this patent application is subject to the protection scope of the appended claims.

What is claimed is:

1. A machine translation method, applied to a computer device having a processor and a memory storing a plurality of computer programs to be executed by the processor, the method comprising:
    obtaining an original source text and a reconstructed source text, the reconstructed source text being a source text obtained by supplementing the original source text with dropped word location information;
    performing semantic encoding on the original source text, to obtain a source vector sequence corresponding to the original source text;
    sequentially decoding the source vector sequence to obtain target vectors, further including:
        performing decoding on the source vector sequence at a current time according to a word vector of a candidate target word determined at a previous time; and
        determining a candidate target word at the current time according to a corresponding target vector at the current time;
    forming a target vector sequence using the target vectors obtained through the sequential decoding;
    performing reconstruction assessment on the source vector sequence and the target vector sequence according to the reconstructed source text, to obtain reconstruction scores corresponding to the candidate target words; and
    generating a target text according to the reconstruction scores and the candidate target words.

2. The method according to claim 1, wherein the obtaining an original source text and a reconstructed source text comprises:
    obtaining the original source text;
    determining a location of a dropped word in the original source text according to a dropped word restoration model; and
    adding a reference character to the location of the dropped word to obtain the reconstructed source text.

3. The method according to claim 1, wherein the sequentially decoding the source vector sequence to obtain target vectors further comprises:
    sequentially obtaining an attention distribution weight vector corresponding to the source vector sequence at the current time;
    calculating a content vector at the current time according to the attention distribution weight vector and the source vector sequence; and
    sequentially calculating the target vector at the current time according to the content vector at the current time, a target vector at the previous time, and the word vector of the candidate target word determined at the previous time, and determining the candidate target word at the current time according to the target vector at the current time.

4. The method according to claim 1, wherein the performing reconstruction assessment on the source vector sequence and the target vector sequence according to the reconstructed source text, to obtain reconstruction scores corresponding to the candidate target words comprises:
    obtaining a source attention distribution weight vector corresponding to the source vector sequence;
    calculating a source content vector according to the source attention distribution weight vector and the source vector sequence;
    obtaining a target attention distribution weight vector corresponding to the target vector sequence;
    calculating a target content vector according to the target attention distribution weight vector and the target vector sequence; and
    performing the reconstruction assessment on the source content vector and the target content vector according to the reconstructed source text, to obtain the reconstruction scores corresponding to the candidate target words.

5. The method according to claim 4, wherein the performing the reconstruction assessment on the source content vector and the target content vector according to the reconstructed source text, to obtain the reconstruction scores corresponding to the candidate target words comprises:
    calculating a hidden layer state vector corresponding to a current word in the reconstructed source text according to a word vector of a previous word of the current word in the reconstructed source text, a hidden layer state vector corresponding to the previous word in the reconstructed source text, a source semantic vector, and a target semantic vector;
    calculating a reconstruction score corresponding to the current word in the reconstructed source text according to the hidden layer state vector corresponding to the current word in the reconstructed source text, the word vector of the previous word of the current word in the reconstructed source text, the source semantic vector, and the target semantic vector; and
    performing continued multiplication on the reconstruction scores corresponding to words in the reconstructed source text, to obtain the reconstruction scores corresponding to the candidate target words.

6. The method according to claim 5, wherein the obtaining a source attention distribution weight vector corresponding to the source vector sequence comprises:

performing first attention mechanism processing on the word vector of the previous word of the current word in the reconstructed source text, the hidden layer state vector corresponding to the previous word in the reconstructed source text, the source vector sequence, and optionally the target content vector, to obtain the source attention distribution weight vector corresponding to the source vector sequence.

7. The method according to claim 5, wherein the obtaining a target attention distribution weight vector corresponding to the target vector sequence comprises:

performing first attention mechanism processing on the word vector of the previous word of the current word in the reconstructed source text, the hidden layer state vector corresponding to the previous word in the reconstructed source text, the target vector sequence, and optionally the source content vector, to obtain the target attention distribution weight vector corresponding to the target vector sequence.

8. The method according to claim 1, wherein the determining a candidate target word at the current time according to a target vector at the current time comprises:

determining the candidate target word at the current time and a translation score corresponding to the candidate target word according to the target vector at the current time; and the generating a target text according to the reconstruction scores and the candidate target words comprises:

generating candidate target texts according to the candidate target words; and screening out the target text corresponding to the original source text from the candidate target texts according to the translation scores and the reconstruction scores.

9. A computer device, comprising a memory and a processor, the memory storing a plurality of computer programs, the computer programs, when executed by the processor, causing the computer device to perform a plurality of operations including:

obtaining an original source text and a reconstructed source text, the reconstructed source text being a source text obtained by supplementing the original source text with dropped word location information;

performing semantic encoding on the original source text, to obtain a source vector sequence corresponding to the original source text;

sequentially decoding the source vector sequence to obtain target vectors, further including:

performing decoding on the source vector sequence at a current time according to a word vector of a candidate target word determined at a previous time; and determining a candidate target word at the current time according to a corresponding target vector at the current time;

forming a target vector sequence using the target vectors obtained through the sequential decoding;

performing reconstruction assessment on the source vector sequence and the target vector sequence according to the reconstructed source text, to obtain reconstruction scores corresponding to the candidate target words; and generating a target text according to the reconstruction scores and the candidate target words.

10. The computer device according to claim 9, wherein the obtaining an original source text and a reconstructed source text comprises:

obtaining the original source text;

determining a location of a dropped word in the original source text according to a dropped word restoration model; and adding a reference character to the location of the dropped word to obtain the reconstructed source text.

11. The computer device according to claim 9, wherein the sequentially decoding the source vector sequence to obtain target vectors further comprises:

sequentially obtaining an attention distribution weight vector corresponding to the source vector sequence at the current time;

calculating a content vector at the current time according to the attention distribution weight vector and the source vector sequence; and sequentially calculating the target vector at the current time according to the content vector at the current time, a target vector at the previous time, and the word vector of the candidate target word determined at the previous time, and determining the candidate target word at the current time according to the target vector at the current time.

12. The computer device according to claim 9, wherein the performing reconstruction assessment on the source vector sequence and the target vector sequence according to the reconstructed source text, to obtain reconstruction scores corresponding to the candidate target words comprises:

obtaining a source attention distribution weight vector corresponding to the source vector sequence;

calculating a source content vector according to the source attention distribution weight vector and the source vector sequence;

obtaining a target attention distribution weight vector corresponding to the target vector sequence;

calculating a target content vector according to the target attention distribution weight vector and the target vector sequence; and performing the reconstruction assessment on the source content vector and the target content vector according to the reconstructed source text, to obtain the reconstruction scores corresponding to the candidate target words.

13. The computer device according to claim 12, wherein the performing the reconstruction assessment on the source content vector and the target content vector according to the reconstructed source text, to obtain the reconstruction scores corresponding to the candidate target words comprises:

calculating a hidden layer state vector corresponding to a current word in the reconstructed source text according to a word vector of a previous word of the current word in the reconstructed source text, a hidden layer state vector corresponding to the previous word in the reconstructed source text, a source semantic vector, and a target semantic vector;

calculating a reconstruction score corresponding to the current word in the reconstructed source text according to the hidden layer state vector corresponding to the current word in the reconstructed source text, the word vector of the previous word of the current word in the reconstructed source text, the source semantic vector, and the target semantic vector; and performing continued multiplication on the reconstruction scores corresponding to words in the reconstructed source text, to obtain the reconstruction scores corresponding to the candidate target words.

14. The computer device according to claim 13, wherein the obtaining a source attention distribution weight vector corresponding to the source vector sequence comprises:
performing first attention mechanism processing on the word vector of the previous word of the current word in the reconstructed source text, the hidden layer state vector corresponding to the previous word in the reconstructed source text, the source vector sequence, and optionally the target content vector, to obtain the source attention distribution weight vector corresponding to the source vector sequence.

15. The computer device according to claim 13, wherein the obtaining a target attention distribution weight vector corresponding to the target vector sequence comprises:
performing first attention mechanism processing on the word vector of the previous word of the current word in the reconstructed source text, the hidden layer state vector corresponding to the previous word in the reconstructed source text, the target vector sequence, and optionally the source content vector, to obtain the target attention distribution weight vector corresponding to the target vector sequence.

16. The computer device according to claim 9, wherein the determining a candidate target word at the current time according to a target vector at the current time comprises:
determining the candidate target word at the current time and a translation score corresponding to the candidate target word according to the target vector at the current time; and
the generating a target text according to the reconstruction scores and the candidate target words comprises:
generating candidate target texts according to the candidate target words; and
screening out the target text corresponding to the original source text from the candidate target texts according to the translation scores and the reconstruction scores.

17. A non-transitory computer-readable storage medium, storing computer-readable instructions that, when executed by a processor of a computer device, causing the computer device to perform a plurality of operations including:
obtaining an original source text and a reconstructed source text, the reconstructed source text being a source text obtained by supplementing the original source text with dropped word location information;
performing semantic encoding on the original source text, to obtain a source vector sequence corresponding to the original source text;
sequentially decoding the source vector sequence to obtain target vectors, further including:
performing decoding on the source vector sequence at a current time according to a word vector of a candidate target word determined at a previous time; and
determining a candidate target word at the current time according to a corresponding target vector at the current time;
forming a target vector sequence using the target vectors obtained through the sequential decoding;
performing reconstruction assessment on the source vector sequence and the target vector sequence according to the reconstructed source text, to obtain reconstruction scores corresponding to the candidate target words; and
generating a target text according to the reconstruction scores and the candidate target words.

18. The non-transitory computer-readable storage medium according to claim 17, wherein the obtaining an original source text and a reconstructed source text comprises:
obtaining the original source text;
determining a location of a dropped word in the original source text according to a dropped word restoration model; and
adding a reference character to the location of the dropped word to obtain the reconstructed source text.

19. The non-transitory computer-readable storage medium according to claim 17, wherein the sequentially decoding the source vector sequence to obtain target vectors further comprises:
sequentially obtaining an attention distribution weight vector corresponding to the source vector sequence at the current time;
calculating a content vector at the current time according to the attention distribution weight vector and the source vector sequence; and
sequentially calculating the target vector at the current time according to the content vector at the current time, a target vector at the previous time, and the word vector of the candidate target word determined at the previous time, and determining the candidate target word at the current time according to the target vector at the current time.

20. The non-transitory computer-readable storage medium according to claim 17, wherein the performing reconstruction assessment on the source vector sequence and the target vector sequence according to the reconstructed source text, to obtain reconstruction scores corresponding to the candidate target words comprises:
obtaining a source attention distribution weight vector corresponding to the source vector sequence;
calculating a source content vector according to the source attention distribution weight vector and the source vector sequence;
obtaining a target attention distribution weight vector corresponding to the target vector sequence;
calculating a target content vector according to the target attention distribution weight vector and the target vector sequence; and
performing the reconstruction assessment on the source content vector and the target content vector according to the reconstructed source text, to obtain the reconstruction scores corresponding to the candidate target words.

* * * * *